US012435456B2

(12) United States Patent
Kim et al.

(10) Patent No.: US 12,435,456 B2
(45) Date of Patent: Oct. 7, 2025

(54) WASHING MACHINE WITH DRYING FUNCTION

(71) Applicant: SAMSUNG ELECTRONICS CO., LTD., Suwon-si (KR)

(72) Inventors: Younghyun Kim, Suwon-si (KR); Heejin Kang, Suwon-si (KR); Bongjin Ko, Suwon-si (KR); Seulgi Lee, Suwon-si (KR); Jiyu Lee, Suwon-si (KR); Hyounyoung Lee, Suwon-si (KR); Seungil Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 257 days.

(21) Appl. No.: 18/134,732

(22) Filed: Apr. 14, 2023

(65) Prior Publication Data

US 2023/0295853 A1    Sep. 21, 2023

Related U.S. Application Data

(63) Continuation of application No. PCT/KR2023/000962, filed on Jan. 19, 2023.

(30) Foreign Application Priority Data

Jan. 25, 2022  (KR) .................. 10-2022-0011007

(51) Int. Cl.
*D06F 25/00*  (2006.01)
*D06F 39/08*  (2006.01)
(Continued)

(52) U.S. Cl.
CPC ............ *D06F 25/00* (2013.01); *D06F 39/088* (2013.01); *D06F 58/206* (2013.01); *D06F 58/24* (2013.01); *D06F 58/26* (2013.01)

(58) Field of Classification Search
None
See application file for complete search history.

(56) References Cited

U.S. PATENT DOCUMENTS 9,207,015 B2   12/2015  Ahn et al.
10,415,177 B2   9/2019  Xu et al.
(Continued)

FOREIGN PATENT DOCUMENTS

EP    3874085 A0    5/2020
EP    3887592 A1    6/2020
(Continued)

OTHER PUBLICATIONS

International Search Report, PCT/ISA/210, dated Apr. 5, 2023 for International Application No. PCT/KR2023/000962.
(Continued)

*Primary Examiner* — Cristi J Tate-Sims
(74) *Attorney, Agent, or Firm* — STAAS & HALSEY LLP

(57) ABSTRACT

A washing machine with drying function includes a cabinet including a laundry insertion hole on a front surface; a tub inside the cabinet and having a rear opening and a front opening; a drum inside the tub; and a heated air supplying device including a heat exchange duct above the tub, and including an evaporator and a condenser, a rear duct behind the tub, an inlet duct between the rear duct and a first side of the heat exchange duct, a supply duct on a second side of the heat exchange duct, a blower fan in front of the tub to generate an airflow from the rear opening, through the rear duct, through the inlet duct, through the heat exchange duct, through the supply duct, and to the front opening, and a dehumidifier inside the rear duct and configured to remove moisture contained in the airflow passing through the rear duct.

16 Claims, 22 Drawing Sheets

(51) Int. Cl.
*D06F 58/20* (2006.01)
*D06F 58/24* (2006.01)
*D06F 58/26* (2006.01)

(56) References Cited

U.S. PATENT DOCUMENTS

2004/0250442 A1* 12/2004 Ryu .................. D06F 58/20
 34/140
2006/0277690 A1 12/2006 Pyo et al.
2016/0083896 A1* 3/2016 Ryoo .................. D06F 58/206
 34/86

FOREIGN PATENT DOCUMENTS

| JP | 2014-30472 A | 2/2014 |
| JP | 2015-89473 A | 5/2015 |
| JP | 5990772 | 9/2016 |
| KR | 10-1997-0001651 A | 1/1997 |
| KR | 10-1235193 B1 | 2/2013 |
| KR | 10-2014-0110407 A | 9/2014 |
| KR | 10-2018-0091409 A | 8/2018 |
| WO | WO 2015/016571 A1 | 2/2015 |
| WO | WO 2018/066805 A1 | 4/2018 |

OTHER PUBLICATIONS

Written Opinion of the International Search Report, PCT/ISA/237, dated Apr. 5, 2023 for International Application No. PCT/KR2023/000962.
Extended European Search Report dated Jan. 8, 2025 for European Patent Application No. 23747259.2.

* cited by examiner

WASHING MACHINE WITH DRYING FUNCTION

CROSS-REFERENCE TO RELATED APPLICATION(S)

This application is a continuation application, under 35 U.S.C. § 111(a), of International Application No. PCT/KR2023/000962, filed on Jan. 19, 2023, which claims priority to Korean Patent Application No. 10-2022-0011007, filed on Jan. 25, 2022 in Korean Intellectual Property Office, the disclosures of which are incorporated herein by reference in their entireties.

BACKGROUND

1. Field

The disclosure relates to a washing machine, and more particularly, to a washing machine with drying function capable of washing and drying laundry.

2. Description of the Related Art

In general, washing machines which wash laundry, and dryers which dry laundry, are formed as separate devices.

Accordingly, consumers dry laundry which has completed washing by using a dryer after washing the laundry using a washing machine.

However, in cases where the washing machine and the dryer are formed as separate devices as described above, there is an inconvenience of a user having to wait until the washing of laundry is completed and then move the washed laundry to the dryer.

To solve the inconvenience described above, a washing machine with drying function has been developed and is being used.

However, the washing machine with drying function of the related art has a problem of the drying function being relatively weaker compared to a dryer having only the drying function.

SUMMARY

Aspects of embodiments of the disclosure will be set forth in part in the description which follows and, in part, will be apparent from the description, or may be learned by practice of the presented embodiments.

According to an embodiment of the disclosure, a washing machine with drying function may include a cabinet including a laundry insertion hole provided on a front surface of the cabinet; a tub disposed inside the cabinet and provided with a rear opening and a front opening; a drum rotatably disposed inside the tub, wherein the laundry insertion hole, the front opening, and the drum are positioned so that laundry is insertable through the laundry insertion hole and then through the front opening to be received in the drum; and a heated air supplying device including a heat exchange duct disposed above the tub, and including an evaporator and a condenser, a rear duct disposed behind the tub, an inlet duct disposed between the rear duct and a first side of the heat exchange duct, a supply duct disposed on a second side of the heat exchange duct, a blower fan disposed in front of the tub and configured to generate an airflow that flows from the rear opening, then through the rear duct, then through the inlet duct, then through the heat exchange duct, then through the supply duct, and then to the front opening, and a dehumidifier disposed inside the rear duct and configured to remove moisture contained in the airflow passing through the rear duct.

According to an embodiment of the disclosure, the washing machine with drying function further includes a heater disposed inside the supply duct, and configured to generate heat to heat the airflow passing through the supply duct.

According to an embodiment of the disclosure, the dehumidifier includes a direct water nozzle disposed at an upper portion of the rear duct, the direct water nozzle being configured to spray water toward a lower portion of the rear duct.

According to an embodiment of the disclosure, the direct water nozzle is connected to a water supply pipe.

According to an embodiment of the disclosure, the washing machine with drying function further includes a dehumidifying valve provided between the direct water nozzle and the water supply pipe, wherein the dehumidifying valve is configured to open and close so as to selectively supply water from the water supply pipe to the direct water nozzle.

According to an embodiment of the disclosure, the dehumidifier includes a Peltier element disposed on an upper portion of the rear duct.

According to an embodiment of the disclosure, the Peltier element includes a cooling surface, and the rear duct includes an opening through which the cooling surface of the Peltier element is exposed.

According to an embodiment of the disclosure, the heater is fixed to an upper surface of the supply duct.

According to an embodiment of the disclosure, the washing machine with drying function further includes a heater holder configured to fix the heater to the upper surface of the supply duct.

According to an embodiment of the disclosure, the supply duct includes a barrier provided on an inner surface of the supply duct, the barrier being configured to block heat, generated by the heater, from the inner surface of the supply duct.

According to an embodiment of the disclosure, a washing machine with drying function may include a cabinet including a laundry insertion hole provided on a front surface of the cabinet; a tub disposed inside the cabinet and provided with a rear opening and a front opening; a drum rotatably disposed inside the tub, wherein the laundry insertion hole, the front opening, and the drum are positioned so that laundry is insertable through the laundry insertion hole and then through the front opening to be received in the drum; and a heated air supplying device including a heat exchange duct disposed above the tub, and including an evaporator and a condenser, a rear duct disposed behind the tub, an inlet duct disposed between the rear duct and a first side of the heat exchange duct, a supply duct disposed on a second side of the heat exchange duct, a blower fan disposed in front of the tub and configured to generate an airflow that flows from the rear opening, then through the rear duct, then through the inlet duct, then through the heat exchange duct, then through the supply duct, and then to the front opening, a heater disposed inside the supply duct and configured to generate heat to heat the airflow passing through the supply duct, and a dehumidifier disposed inside, and at an upper portion of, the rear duct and configured to remove moisture contained in the airflow passing through the rear duct.

According to an embodiment of the disclosure, the rear duct includes an opening at an upper portion of the rear duct, the dehumidifier includes a Peltier element, and the Peltier element is disposed in the opening at the upper portion of the rear duct.

According to an embodiment of the disclosure, the dehumidifier includes a direct water nozzle that is disposed at an upper portion of the rear duct, the direct water nozzle being configured to spray water toward a lower portion of the rear duct.

According to an embodiment of the disclosure, the dehumidifier includes a connection pipe configured to connect the direct water nozzle to a water supply pipe, and a dehumidifying valve provided to the connection pipe and configured to open and close so as to selectively supply water from the water supply pipe to the direct water nozzle.

According to an embodiment of the disclosure, the washing machine with drying function further includes a heater holder configured to fix the heater to an upper surface of the supply duct.

BRIEF DESCRIPTION OF THE DRAWINGS

These and/or other embodiments of the disclosure will become apparent and more readily appreciated from the following description of the embodiments, taken in conjunction with the accompanying drawings of which.

DETAILED DESCRIPTION

Descriptions below, which takes into reference the accompanying drawings, are provided to assist in a comprehensive understanding of various embodiments of the disclosure as defined by the claims and their equivalents. Although various specific details are included to assist in the understanding herein, the above are to be understood as merely example embodiments. Accordingly, it will be understood by those of ordinary skill in the art that various modifications may be made to various embodiments described herein without departing from the scope and spirit of the disclosure. In addition, descriptions of well-known functions and configurations will be omitted for clarity and conciseness.

Terms and words used in the description below and in the claims are not limited to its bibliographical meaning, and are used merely to assist in a clear and coherent understanding of the disclosure. Accordingly, the description below of the various embodiments of the disclosure are provided simply as examples and it will be clear to those of ordinary skill in the art that the example embodiments as defined by the appended claims and their equivalents are not for limiting the disclosure.

Terms such as first and second may be used in describing various elements, but the elements are not limited by the above-described terms. The above-described terms may be used only for the purpose of distinguishing one element from another element. For example, a first element may be designated as a second element, and likewise, a second element may be designated as a first element without exceeding the scope of protection.

The terms used in the embodiments of the disclosure may be interpreted to have meanings generally understood to one of ordinary skill in the art unless otherwise defined.

In addition, terms such as 'tip end,' 'back end,' 'upper part,' 'lower part,' 'upper end,' 'lower end,' and the like used in the disclosure may be defined based on the drawings, and forms and locations of each element are not limited by these terms.

The embodiments address at least the above-mentioned problems and/or disadvantages and provide a washing machine with drying function having a drying function which is equal to a drying-only dryer.

Hereinafter, a washing machine with drying function 1 according to an embodiment will be described in detail with reference to the accompanied drawings.

Figure 1:
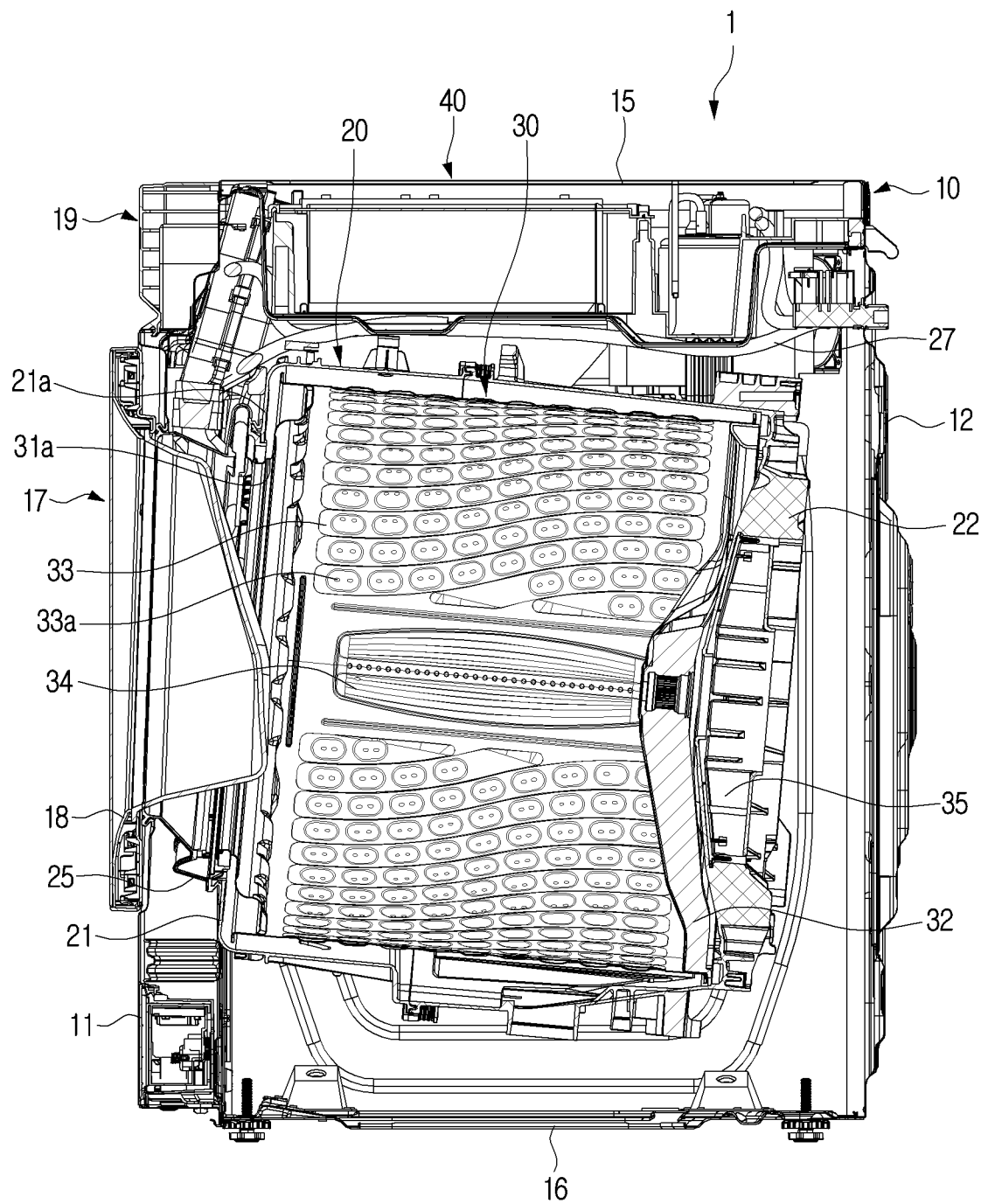
FIG. 1 is a cross-sectional view illustrating a washing machine with drying function according to an embodiment.
Figure 2:
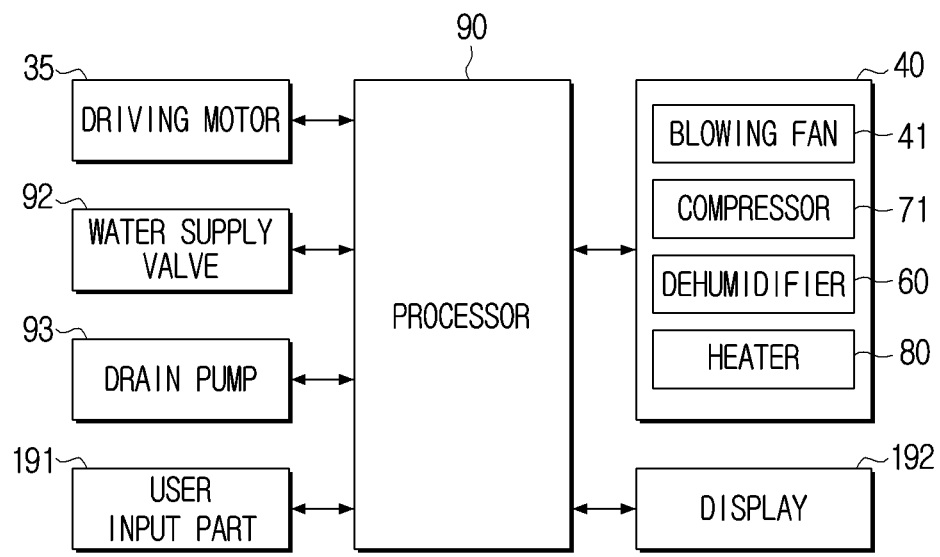
FIG. 2 is a functional block diagram of a washing machine with drying function according to an embodiment.

FIG. 1 is a cross-sectional view illustrating a washing machine with drying function according to an embodiment. FIG. 2 is a functional block diagram of a washing machine with drying function according to an embodiment.

Referring to FIGS. 1 and 2, the washing machine with drying function 1 according to an embodiment may include a cabinet 10, a tub 20, a drum 30, and a heated air supplying device 40.

The cabinet 10 may form an exterior of the washing machine with drying function 1, and may be formed substantially in a rectangular parallelepiped shape. The cabinet 10 may include a front cover 11, a rear cover 12, a left cover, a right cover, an upper cover 15, and a lower cover 16.

A laundry insertion hole 18 through which laundry can be put into and taken out of the cabinet 10 may be provided on a front surface of the cabinet 10. In other words, the laundry insertion hole 18 may be formed at the front cover 11 of the cabinet 10.

A door 17 may be disposed at the laundry insertion hole 18 so as to be able to open and close. A control panel 19 for controlling the washing machine 1 may be provided at an upper part of the front cover 11 of the cabinet 10.

The control panel 19 may include a user input part 191 for receiving user inputs related to the operation of the washing machine 1 from the user, a display 192 for displaying information associated with the washing machine 1 and washing processes, and a processor 90 configured to control the washing machine 1.

The user input part 191 may include a plurality of buttons for receiving a user input, and may be configured to output an electrical signal corresponding to the received user input to the processor 90.

The tub 20 may be installed at the inside of the cabinet 10, and may be formed in a hollow cylindrical shape on which a front opening 21a is provided toward the laundry insertion hole 18 of the front cover 11. The front opening 21a of the tub 20 may be formed to have a size corresponding to the laundry insertion hole 18. A rear surface plate 22 may be provided at a rear end of the tub 20. A rear opening 22a (shown in FIG. 8) through which air inside the tub 20 is discharged may be provided at the rear surface plate 22.

The tub 20 may contain washing water of a predetermined amount necessary in washing. The tub 20 may be supported and fixed to an inner surface of the cabinet 10 by a tension spring, an oil damper, and the like.

A diaphragm 25 may be installed between the tub 20 and the front cover 11 of the cabinet 10. The diaphragm 25 may be formed substantially in an annular shape. One end of the diaphragm 25 may be fixed to a front surface 21 of the tub 20 at which the front opening 21a is provided, and the other end of the diaphragm 25 may be fixed to an inner circumference of the laundry insertion hole 18 of the front cover 11 of the cabinet 10.

The diaphragm 25 may be formed such that the washing water contained in the tub 20 is not leaked to the outside of the tub 20, and may form a pathway through which the laundry passes. In addition, the diaphragm 25 may block vibration which is generated when the drum 30 is rotated from being transferred to the front cover 11 of the cabinet 10 through the tub 20.

The drum 30 may be rotatably installed at an inside of the tub 20, and may be formed substantially in a hollow cylindrical shape. A drum opening 31a corresponding to the laundry insertion hole 18 of the cabinet 10 and the front opening 21a of the tub 20 may be provided at a front surface of the drum 30, and a rear surface plate 32 may be provided at a rear end of the drum 30.

At a side surface 33 of the drum 30, a plurality of through-holes 33a through which the washing water may pass may be provided. The rear surface plate 32 of the drum 30 may be provided with a plurality of through-holes. Accordingly, air inside the drum 30 may be discharged to a space between the drum 30 and the tub 20 through the plurality of through-holes 33a formed at the side surface 33 of the drum 30 and the plurality of through-holes formed at the rear surface plate 32.

In addition, a plurality of lifts 34 which may raise the laundry may be provided on an inner circumferential surface of the drum 30. The drum 30 may rotate about a central axis by a driving device which includes a driving motor 35 installed at the rear surface plate 32.

A water supply device for supplying water to the tub 20 may be provided above the tub 20, and a water draining device for draining water from the tub 20 to the outside may be disposed below the tub 20.

The water supplying device may include a water supply pipe 27 connected with an external water supply source and a water supply valve 92 which opens and closes the water supply pipe. One end of the water supply pipe 27 may be connected to the diaphragm 25. The water supply pipe 27 may be provided with a detergent intake part. The water supply pipe 27 may be branched to be connected to a direct water nozzle 61 (shown in FIG. 9) to be described later.

The water draining device may be formed to discharge the washing water contained in the tub 20 to the outside of the washing machine with drying function 1. The water draining device may be installed below the tub 20, and include a drain pump 93 and a water drain pipe. When the drain pump 93 is operated, the washing water contained in the tub 20 may be discharged to the outside of the washing machine 1 through the water drain pipe.

The heated air supplying device 40 to dry the laundry which was washed by a rotation of the drum 30 may be installed above the tub 20. The heated air supplying device 40 may be formed to generate heated air by heating and drying air which is discharged from the tub 20 and to circulate the heated air through the inside of the tub 20 so as to dry the laundry which is located at the inside of the drum 30. In the description below, the heated air may refer to air which is heated and dried by the heated air supplying device 40.

The heated air supplying device 40 may include a blower fan 41, a compressor 71, a dehumidifier 60, and a heater 80.

The blower fan 41 generates an airflow so that air may circulate through the drum 30 and the heated air supplying device 40. The compressor 71 may be included in a heat exchange part 70 (shown in FIG. 9) formed to dry and heat the air discharged from the drum 30. In addition, the heated air supplying device 40 may include the heater 80 that auxiliary heats the air supplied to the drum 30 and the dehumidifier 60 that auxiliary removes moisture from the air discharged from the drum 30.

However, the heated air supplying device 40 according to another example may not include any one of the dehumidifier 60 and the heater 80.

Figure 3:
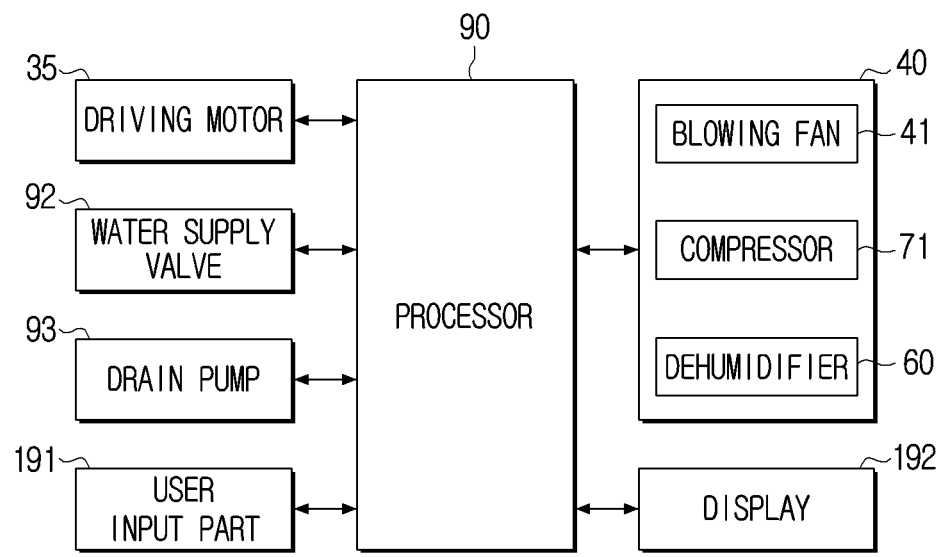
FIG. 3 is a functional block diagram of a washing machine with drying function according to an embodiment.

For example, as illustrated in FIG. 3, the heated air supplying device 40 may not include the heater 80. FIG. 3 is a functional block diagram of a washing machine with drying function according to an embodiment.

In this case, in the air discharged from the drum 30, moisture may be primarily removed by the dehumidifier 60, and then moisture may be secondarily removed by the evaporator 73 of the heat exchange part 70. The moisture-removed air may be heated by the condenser 72 of the heat exchange part 70 and then supplied to the drum 30.

Figure 4:
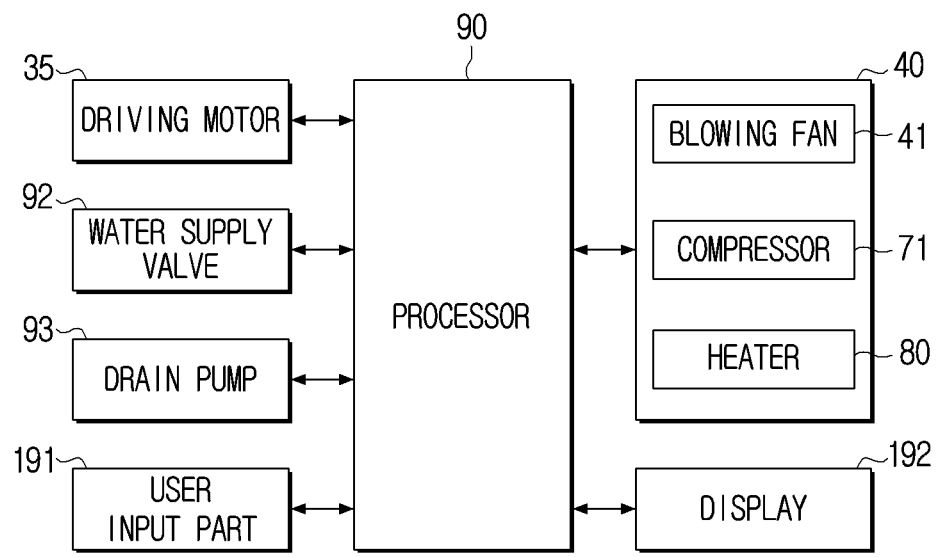
FIG. 4 is a functional block diagram of a washing machine with drying function according to an embodiment.

As another example, as illustrated in FIG. 4, the heated air supplying device 40 may not include the dehumidifier 60. FIG. 4 is a functional block diagram of a washing machine with drying function according to an embodiment.

In this case, the air discharged from the drum 30 may be dehumidified by the evaporator 73 of the heat exchange part 70, and the dehumidified air may be primarily heated by the condenser 72. The air primarily heated by the heat exchange part 70 may be secondarily heated by the heater 80 and supplied to the drum 30.

Hereinafter, the heated air supplying device 40 according to an embodiment will be described in detail with reference to FIGS. 5 to 8.

Figure 5:
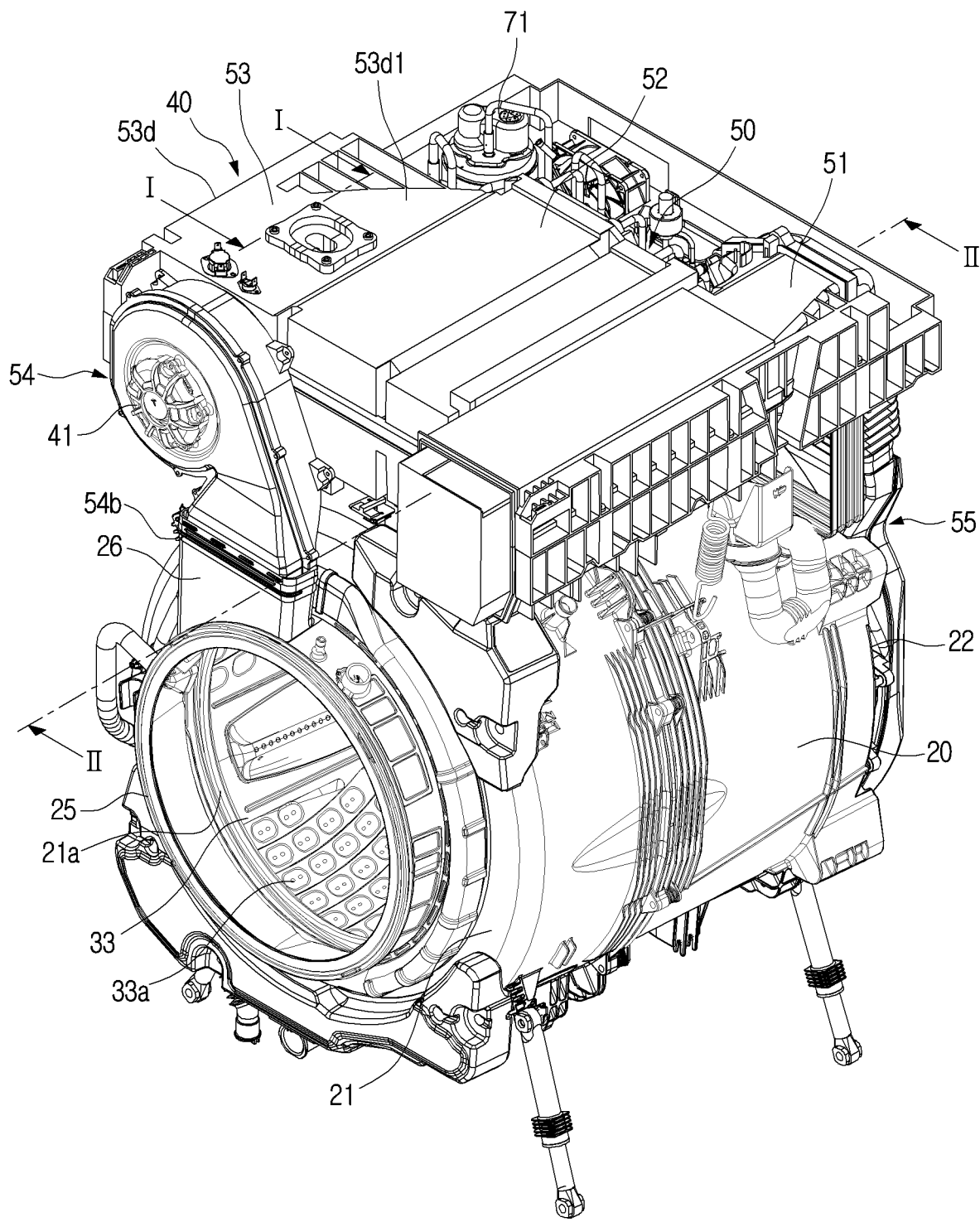
FIG. 5 is a perspective view illustrating a heated air supplying device of a washing machine with drying function according to an embodiment.
Figure 6:
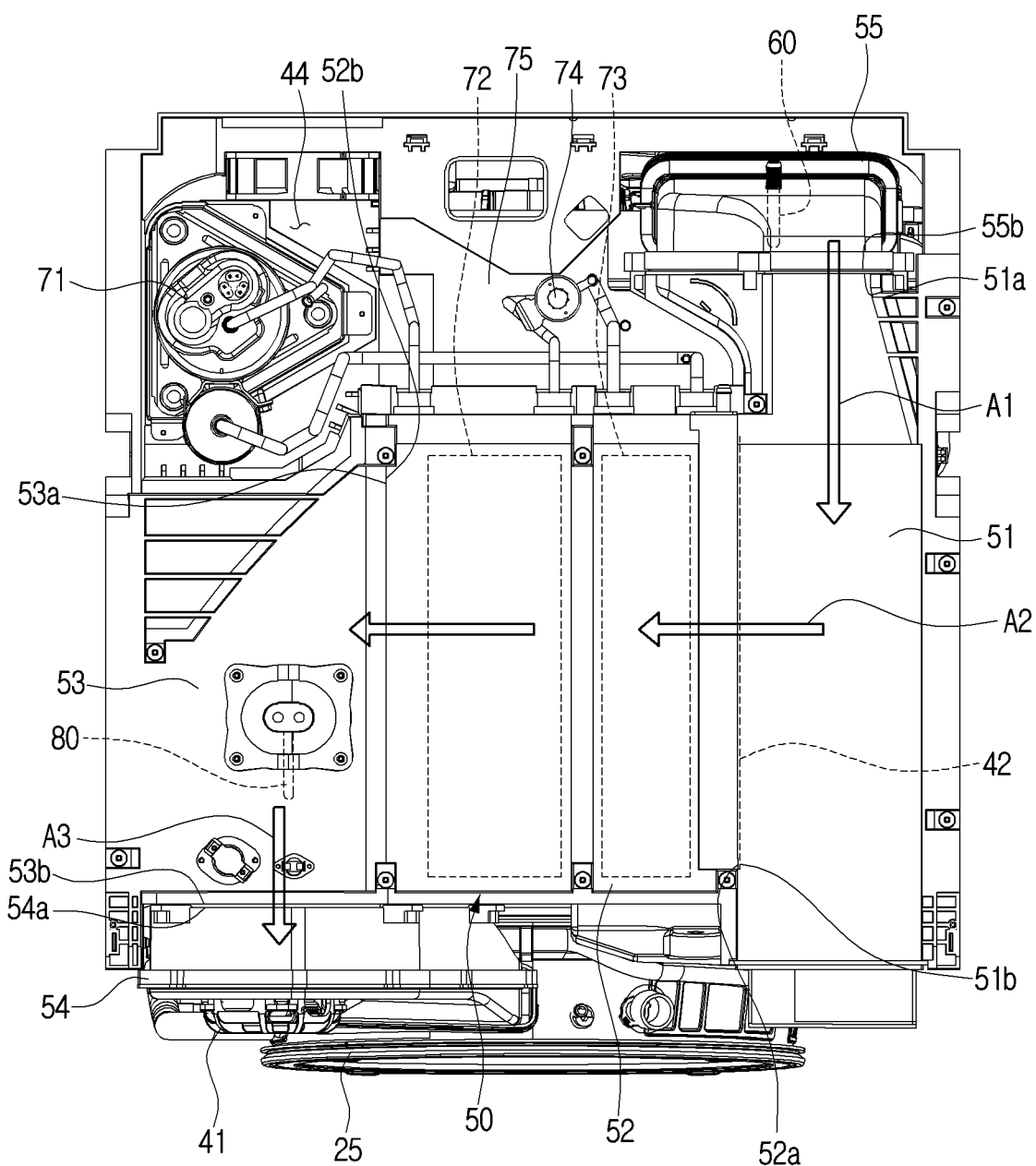
FIG. 6 is a plane view illustrating a heated air supplying device of a washing machine with drying function according to an embodiment.
Figure 7:
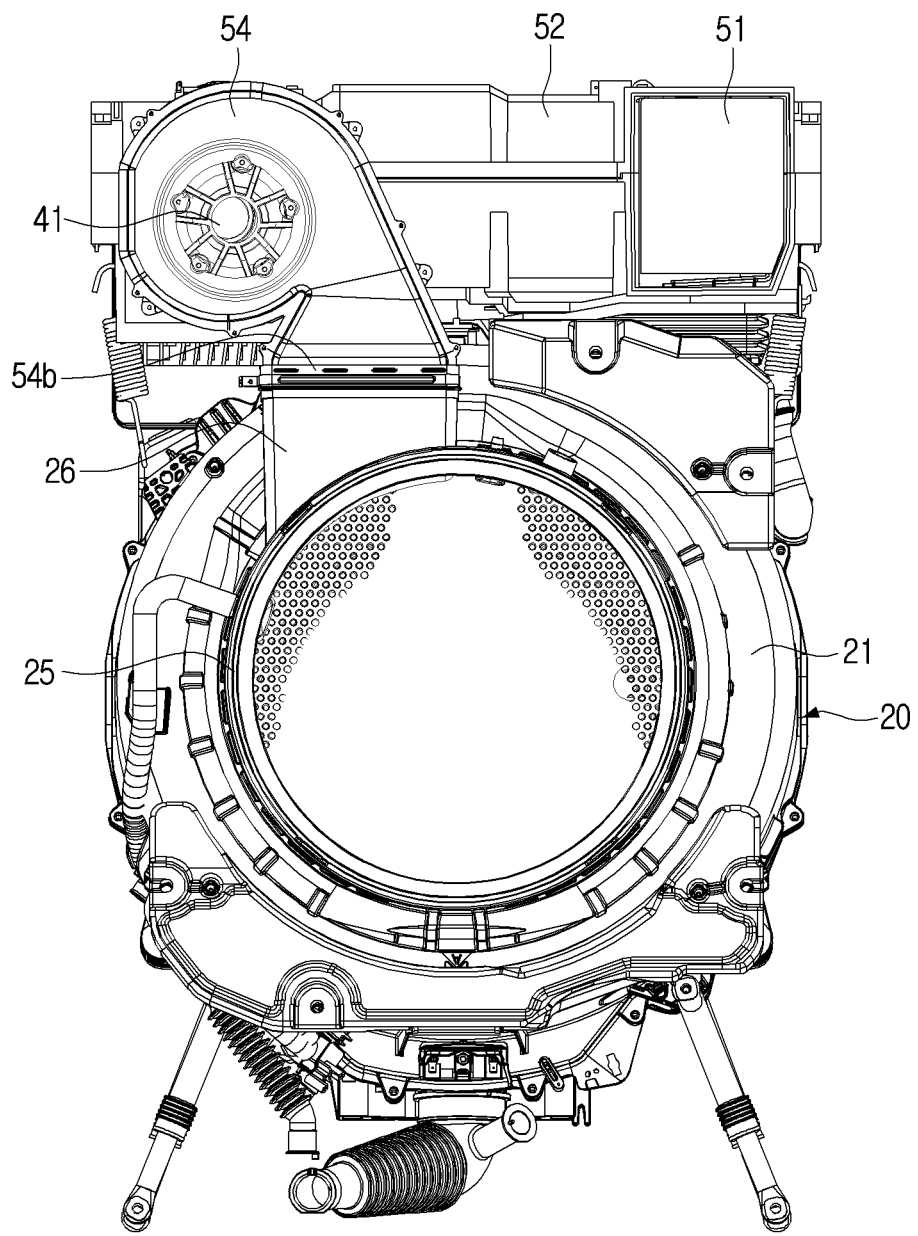
FIG. 7 is a front view illustrating a heated air supplying device of a washing machine with drying function according to an embodiment.
Figure 8:
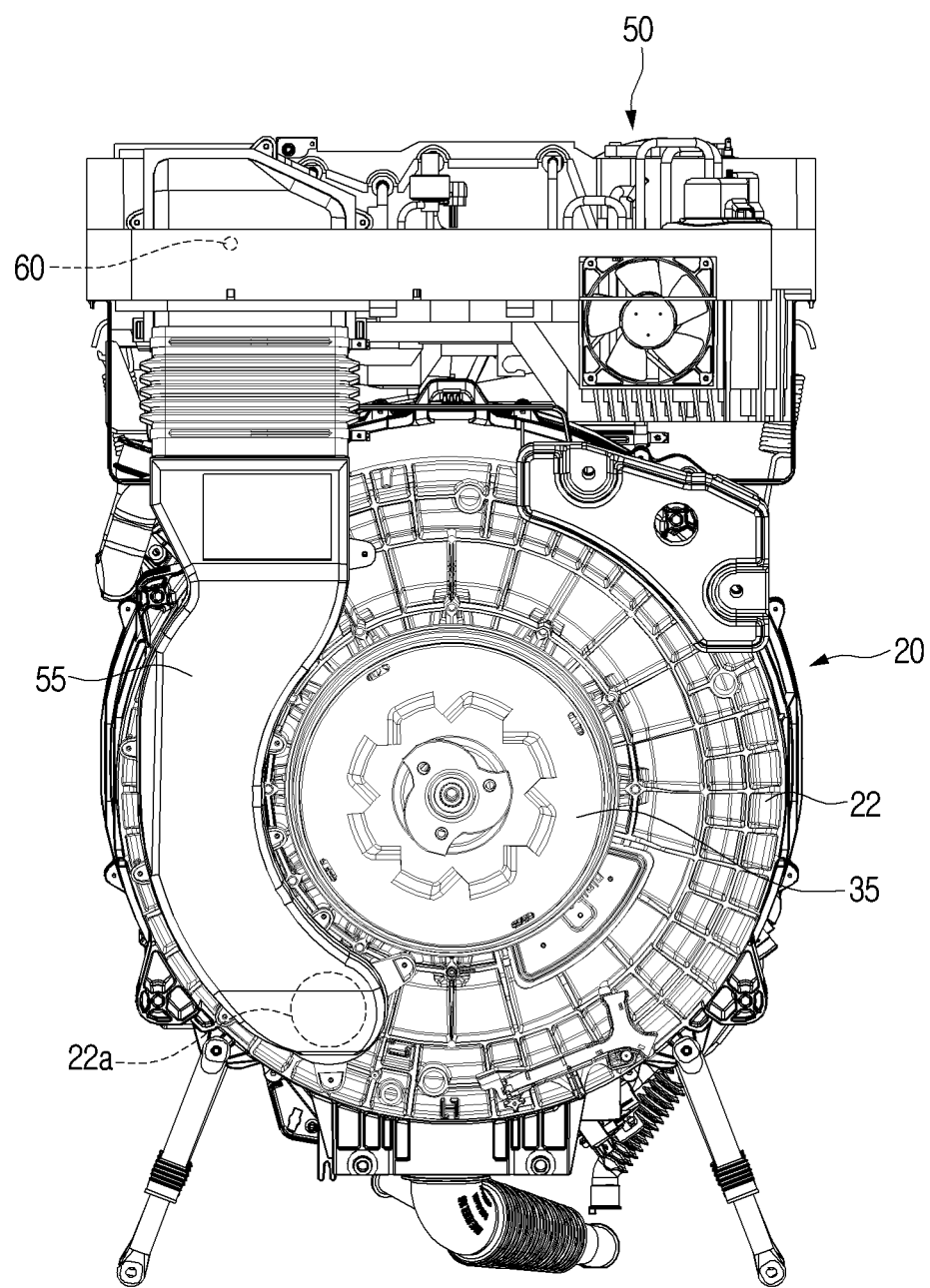
FIG. 8 is a back view illustrating a heated air supplying device of a washing machine with drying function according to an embodiment.

FIG. 5 is a perspective view illustrating a heated air supplying device of a washing machine with drying function according to an embodiment. FIG. 6 is a plane view illustrating a heated air supplying device of a washing machine with drying function according to an embodiment. FIG. 7 is a front view illustrating a heated air supplying device of a washing machine with drying function according to an embodiment. FIG. 8 is a back view illustrating a heated air supplying device of a washing machine with drying function according to an embodiment.

Referring to FIGS. 5 to 8, the washing machine with drying function 1 according to an embodiment may include the tub 20, the drum 30, and the heated air supplying device 40.

The heated air supplying device 40 may be installed above the tub 20, and may be formed so as to dry the laundry which is washed by the rotation of the drum 30. The heated air supplying device 40 may be formed to generate heated air by drying and heating air which is discharged from the tub 20 and to circulate the heated air through the inside of the tub 20 so as to dry the laundry which is located at the inside of the drum 30.

Referring to FIG. 5, the heated air supplying device 40 may include an upper duct 50 which is provided at the upper side of the tub 20, a rear duct 55 which is provided at the rear surface of the tub 20, the blower fan 41 for circulating air, and the heat exchange part 70 (shown in FIG. 9) which removes moisture included in the air and heats the air.

The upper duct 50 may be formed to connect the rear duct 55 and the blower fan 41 which is installed at the front side of the tub 20. The upper duct 50 may be formed substantially in an L-shape. An inlet port through which air that is discharged from the tub 20 is introduced may be provided at a rear surface of the upper duct 50, and an outlet port through which air is discharged may be provided at a front surface of the upper duct 50. Here, the front surface and the rear surface of the upper duct 50 may respectively mean surfaces corresponding to the front cover 11 and the rear cover 12 of the cabinet 10.

The upper duct 50 may be formed such that the flow of air introduced from the rear side, that is, the airflow, is bent in a right-angle direction, moved a predetermined distance in a straight line, and then bent again in the right-angle direction to be discharged to the outside toward the front side of the cabinet 10. In other words, the upper duct 50 may form an upper flow path which guides the airflow such that the airflow introduced from the rear side is bent in a right-angle direction, moved the predetermined distance in a straight line, and then bent again in the right-angle direction to be discharged to the outside toward the front side of the cabinet 10.

The upper duct 50 may be installed adjacent to the front surface 21 of the tub 20. Accordingly, a space 44 in which the compressor 71 of the heat exchange part 70 is disposed may be provided between the rear surface of the tub 20 and the upper duct 50 above the tub 20. Here, the front surface 21 of the tub 20 may refer to a surface at which the front opening 21a is formed. One side of the tub 20 may refer to a left side or a right side based on the front surface 21 of the tub 20, and the other side of the tub 20 may refer to the opposite side of the one side of the tub 20 based on the front surface 21 of the tub 20.

In the embodiment shown in FIGS. 5 and 6, the upper duct 50 may be disposed to be adjacent to the front surface 21 of the tub 20. Accordingly, the space 44 in which the compressor 71 is installed may be provided between the upper duct 50 and the rear surface of the tub 20 above the tub 20.

The inlet port 51a of the upper duct 50 may be provided to be adjacent to the one side and the rear surface of the tub 20. The inlet port 51a of the upper duct 50 may be in communication with the outlet port 55b of the rear duct 55. Accordingly, the air that is discharged from the tub 20 may be introduced into the upper duct 50 in a direction from the rear side of the tub 20 toward the front side of the tub 20.

An outlet port 53b of the upper duct 50 may be provided to be adjacent to the other side and the front surface 21 of the tub 20. Accordingly, the air that is discharged from the upper duct 50 may be discharged toward the front side of the tub 20.

The inlet port 51a and the outlet port 53b of the upper duct 50 may be provided in a diagonal direction above the tub 20. In other words, the inlet port 51a of the upper duct 50 may be provided at one corner of the tub 20, and the outlet port 53b of the upper duct 50 may be provided at the other corner of the tub 20 which is positioned at the opposite side in the diagonal direction.

The blower fan 41 may be installed at the outlet port 53b of the upper duct 50. The blower fan 41 may be contained inside a blow duct 54 which connects the upper duct 50 and the tub 20. An inlet 54a of the blow duct 54 may be formed so as to suction air being discharged from the outlet port 53b of the upper duct 50 toward the front side, and an outlet 54b of the blow duct 54 may be provided to discharge the airflow toward the diaphragm 25.

The upper duct 50 may include an inlet duct 51, a heat exchange duct 52, and a supply duct 53.

The inlet duct 51 may be provided to be adjacent to the one side of the tub 20 above the tub 20, and formed for the airflow which is discharged from the rear opening 22a of the rear surface plate 22 of the tub 20 to be introduced. The inlet duct 51 may be formed so that the introduced airflow flows in a straight line.

An inlet 51a of the inlet duct 51 may be connected with an outlet 55b of the rear duct 55. The inlet 51a of the inlet duct 51 may form the inlet port 51a of the upper duct 50.

The inlet 51a of the inlet duct 51 may be provided at the rear end of the inlet duct 51, and an outlet 51b of the inlet duct 51 may be provided at one side surface of the inlet duct 51, that is, the side surface that contacts the heat exchange duct 52. Accordingly, the outlet 51b of the inlet duct 51 may form a right-angle with the inlet 51a of the inlet duct 51.

A lint filter 42 may be installed in the inlet duct 51. The lint filter 42 may be installed to be separable from the inlet duct 51. The lint filter 42 may be installed detachably from the inlet duct 51 at the front side of the tub 20.

The outlet 51b of the inlet duct 51 may be formed to be greater than the inlet 51a. For example, the outlet 51b of the inlet duct 51 may be formed to be greater by two times or more than the inlet 51a of the inlet duct 51. As described above, when the outlet 51b of the inlet duct 51 is formed greater than the inlet 51a, the size of the lint filter 42 that is installed at the outlet 51b of the inlet duct 51 may be formed to be greater.

In other words, the lint filter 42 may be formed to have a size corresponding to the inlet 52a of the heat exchange duct 52. When the size of the lint filter 42 is made greater, resistance in the duct by the lint filter 42 may be reduced.

The inlet duct 51 may have a rectangular cross-section, and the rear end thereof may be connected to the rear duct 55. In other words, the inlet 51a may be provided at the rear surface of the inlet duct 51. The inlet duct 51 may be installed to be adjacent to the one side of the tub 20 above the tub 20. The inlet duct 51 may be disposed so that a front surface of the inlet duct 51 is adjacent to the front surface 21 of the tub 20 and the rear surface thereof is adjacent to the rear surface plate 22 of the tub 20.

The outlet 51b may be provided at the one side surface of the inlet duct 51. The outlet 51b of the inlet duct 51 may be formed to have a shape and size that corresponds to an inlet 52a of the heat exchange duct 52.

The outlet 51b of the inlet duct 51 and the inlet 52a of the heat exchange duct 52 may be formed in a rectangular shape. The outlet 51b of the inlet duct 51 may be formed to be the same as or greater than the size of the inlet 52a of the heat exchange duct 52. A width of the outlet 51b of the inlet duct 51 may be smaller than a length of the inlet duct 51.

The airflow introduced into the inlet 51a of the inlet duct 51 may pass through the lint filter 42 which is installed at the outlet 51b and then introduced into the inlet 52a of the heat exchange duct 52.

The heat exchange duct 52 may be provided at a right-angle with respect to the inlet duct 51 above the tub 20, and connected at one side of the inlet duct 51. The heat exchange duct 52 may be formed so that the introduced airflow flows in a straight line.

A width of the heat exchange duct 52 may be maximized as much as possible to maximize a heat transfer area. However, the width of the heat exchange duct 52 may be smaller than the length of the inlet duct 51. For example, the width of the heat exchange duct 52 may be formed to be greater than or equal to half of a length of the tub 20. Accordingly, a portion of the inlet duct 51 may protrude from the rear surface of the heat exchange duct 52 toward the rear cover 12 of the cabinet 10.

The inlet 52a of the heat exchange duct 52 may be provided at one end of the heat exchange duct 52, and an outlet 52b of the heat exchange duct 52 may be provided at the other end of the heat exchange duct 52. In other words, the inlet 52a and the outlet 52b of the heat exchange duct 52 may be provided to face each other in a straight line. The inlet 52a and the outlet 52b of the heat exchange duct 52 may be formed to be the same as the cross-section of the heat exchange duct 52.

The inlet 52a of the heat exchange duct 52 may be connected with the outlet 51b of the inlet duct 51. The outlet 51b of the inlet duct 51 may be formed to have a shape and size that corresponds to the inlet 52a of the heat exchange duct 52.

The heat exchange duct 52 may have a rectangular cross-section, and both ends thereof may be opened. The heat exchange duct 52 may be formed to have as wide a cross-section area as possible to maximize the heat transfer area.

The heat exchange duct 52 may be connected at a right-angle with the inlet duct 51. In other words, the heat exchange duct 52 and the inlet duct 51 may be connected to each other so that a center line in a length direction of the heat exchange duct 52 and a center line in a length direction of the inlet duct 51 form a right-angle.

The heat exchange duct 52 may be installed above the tub 20 so that the front surface thereof is adjacent to the front surface 21 of the tub 20. The rear surface of the heat exchange duct 52 may be spaced apart by a predetermined distance from the rear surface of the tub 20.

The evaporator 73 and the condenser 72 of the heat exchange part 70 may be disposed inside the heat exchange duct 52. Accordingly, the airflow that flows through the heat exchange duct 52 may sequentially pass the evaporator 73 and the condenser 72.

The supply duct 53 may be provided to be adjacent to the other side of the tub 20 above the tub 20, and formed to discharge the airflow introduced from the heat exchange duct 52 to the blower fan 41. The supply duct 53 may be connected with the heat exchange duct 52 at a right-angle. The supply duct 53 may be formed so that the introduced airflow flows in a straight line.

An inlet 53a of the supply duct 53 may be connected with the outlet 52b of the heat exchange duct 52. The inlet 53a of the supply duct 53 may be provided at one side surface of the supply duct 53, that is, a side surface which contacts the heat exchange duct 52. The inlet 53a of the supply duct 53 may be formed to have a shape and size that corresponds to the outlet 52b of the heat exchange duct 52.

An outlet 53b of the supply duct 53 may be formed at a front surface of the supply duct 53, and provided at a right-angle with the inlet 53a of the supply duct 53. The outlet 53b of the supply duct 53 may be connected with a suction hole of the blower fan 41, that is, the inlet 54a of the blow duct 54. The outlet 53b of the supply duct 53 may form the outlet port 53b of the upper duct 50.

The outlet 53b of the supply duct 53 may be formed to discharge air toward the front side of the tub 20. Accordingly, the air may be discharged from the outlet 53b of the supply duct 53 in a direction that is roughly perpendicular to the front surface of the cabinet 10.

For example, the outlet 53b of the supply duct 53 and the suction hole of the blower fan 41 which is installed at the front side of the tub 20, that is, the inlet 54a of the blow duct 54, may be formed for the airflow that is discharged from the outlet 53b of the supply duct 53 to be suctioned into the blower fan 41 in a straight line.

The supply duct 53 may have a rectangular cross-section, and a front end thereof may be connected with the blower fan 41. In other words, the outlet 53b of the supply duct 53 may be provided at the front end of the supply duct 53. The outlet 53b of the supply duct 53 may be formed to have a shape and size that corresponds with the suction hole of the blower fan 41.

The supply duct 53 may be installed to be adjacent to the other side of the tub 20 above the tub 20. The supply duct 53 may be disposed so that the front surface of the supply duct 53 is adjacent to the front surface 21 of the tub 20 and the rear surface thereof is spaced apart at a predetermined distance from the rear surface of the tub 20.

The supply duct 53 may be connected at a right-angle with the heat exchange duct 52. In other words, the supply duct 53 and the heat exchange duct 52 may be connected to each other so that the center line in the length direction of the heat exchange duct 52 and a center line in a length direction of the supply duct 53 form a right-angle.

The inlet 53a may be provided at the one side surface of the supply duct 53. The inlet 53a of the supply duct 53 may be formed to have a shape and size that corresponds to the outlet 52b of the heat exchange duct 52. For example, the inlet 53a of the supply duct 53 and the outlet 52b of the heat exchange duct 52 may be formed in a rectangular shape. The supply duct 53 may be formed to have a length that is roughly the same as the width of the heat exchange duct 52.

The rear surface and other side surface 53d of the supply duct 53 may be connected by an inclined surface 53d1. Thus, the airflow introduced into the inlet 53a of the supply duct 53 may collide with the inclined surface 53d1 and be discharged through the outlet 53b of the supply duct 53. When the inclined surface 53d1 is installed in the supply duct 53 as described above, the airflow introduced into the supply duct 53 may be effectively guided to the outlet 53b. Alternatively, the inclined surface 53d1 of the supply duct 53 may be formed as a curved surface which can guide the airflow introduced into the inlet 53a to the outlet 53b.

A heater 80 may be installed inside the supply duct 53. The heater 80 may be configured to heat the air passing through the supply duct 53.

The front surface of the inlet duct 51, the front surface of the heat exchange duct 52, and the front surface of the supply duct 53 may be positioned on substantially the same plane. In addition, the space 44 may be formed between the one side surface of the inlet duct 51, the rear surface of the heat exchange duct 52, the rear surface of the supply duct 53, and the rear surface of the tub 20. In the space 44, the compressor 71, an expansion valve 74, and a refrigerant pipe 75 of the heat exchange part 70 may be installed.

The rear duct 55 may be provided on the rear surface of the tub 20, that is, on the rear surface plate 22, and formed to guide the air that is discharged from the tub 20 toward the upper side of the tub 20. The rear opening 22a through which the air is discharged may be provided at the rear surface plate 22 of the tub 20. An inlet of the rear duct 55 may be connected with the rear opening 22a of the tub 20.

The outlet 55b of the rear duct 55 may be connected with the inlet 51a of the inlet duct 51. The outlet 55b of the rear duct 55 may be formed to have a shape and size corresponding to the inlet 51a of the inlet duct 51. Accordingly, the air discharged from the rear opening 22a of the tub 20 may be introduced into the inlet duct 51 through the rear duct 55.

The rear duct 55 may be installed to be biased toward one side on the rear surface plate 22 of the tub 20. Accordingly, the outlet 55b of the rear duct 55 may be provided to be biased to one side on the rear surface of the tub 20.

The dehumidifier 60 may be provided inside the rear duct 55. The dehumidifier 60 may be formed to remove moisture contained in the air passing through the rear duct 55. The dehumidifier 60 may be formed in an air cooling type or a water cooling type. For example, a Peltier element may be used as the air-cooled dehumidifier 60. The water-cooled dehumidifier 60 may use a direct water nozzle 61 (shown in FIG. 9) formed to supply water to the rear duct 55.

The blower fan 41 may be formed to generate a flow of air, that is, an airflow so that the air discharged from the supply duct 53 is supplied to the front opening 21a of the tub 20.

The blower fan 41 may be installed on the front surface 21 of the tub 20. The blower fan 41 may be formed so that the airflow is introduced into the rear surface thereof and discharged through a lower surface thereof. In other words, the blower fan 41 may be formed so that a discharge direction of the airflow and an introduced direction of the airflow form an approximately 90 degrees. Accordingly, when the blower fan 41 operates, the air which is discharged from the outlet of the supply duct 53 toward the front side of the tub 20 may be introduced into the blower fan 41, and the air may be discharged downwards from the blower fan 41 to the diaphragm 25.

The blower fan 41 may be contained inside the blow duct 54. The blow duct 54 may be installed at the front surface 21 of the tub 20, and connect the supply duct 53 and the diaphragm 25. Accordingly, the air discharged from the supply duct 53 may be supplied to the inside of the diaphragm 25 through the blow duct 54.

The blow duct 54 may be formed so that the airflow discharged from the blower fan 41 is supplied to the diaphragm 25 positioned below the blower fan 41. The blow duct 54 may be formed so that the airflow generated by the blower fan 41 is supplied in a straight line to the inside of the diaphragm 25.

The inlet 54a of the blow duct 54 may be provided at the rear surface thereof, and form the suction hole of the blower fan 41. The inlet 54a of the blow duct 54 may be connected with the outlet 53b of the supply duct 53. The inlet 54a of the blow duct 54 and the outlet 53b of the supply duct 53 may be positioned in a straight line. In other words, the inlet 54a of the blow duct 54 may be directly connected to the outlet 53b of the supply duct 53.

The outlet 54b of the blow duct 54 may be provided at the lower surface of the blow duct 54, and connected with an inlet port 25a of the diaphragm 25. The outlet 54b of the blow duct 54 and the inlet port 25a of the diaphragm 25 may be positioned in a straight line. In other words, the outlet 54b of the blow duct 54 may be directly connected with the inlet port 25a of the diaphragm 25.

A connecting part 26 to which the blow duct 54 is connected may be provided on the upper part of the diaphragm 25. The connecting part 26 may be formed to have a shape and size that corresponds to the lower surface of the blow duct 54, and the inlet port 25a corresponding to the outlet 54b of the blow duct 54 may be provided inside the connecting part 26.

Accordingly, the airflow that is discharged by the blower fan 41 may be introduced into the inside of the diaphragm 25, that is, the inside of the drum 30, in a straight line through the blow duct 54 and the connecting part 26.

A sirocco fan may be used as the blower fan 41.

When the blower fan 41 rotates, the air may be suctioned into the inlet 54a of the blow duct 54 and then discharged through the outlet 54b provided on the lower surface of the blow duct 54. Accordingly, the direction of the airflow discharged from the outlet 54b of the blow duct 54 may form approximately 90 degrees with the direction of the airflow which is suctioned into the inlet 54a of the blow duct 54.

The heat exchange part 70 may be formed to remove moisture from the air that passes through the heat exchange duct 52 and heat the air, thereby making high temperature dry air. The heat exchange part 70 may be formed as a heat pump.

The heat exchange part 70 may include the compressor 71, the evaporator 73, the condenser 72, and the expansion valve 74. In addition, the heat exchange part 70 may include the refrigerant pipe 75 through which the refrigerant circulates by connecting the compressor 71, the evaporator 73, the condenser 72, and the expansion valve 74.

The heat exchange part 70 may be formed to remove the moisture contained in the air and heat the air through heat exchange between the refrigerant and the air while the refrigerant circulates through the condenser 72, the expansion valve 74, and the evaporator 73 by the compressor 71.

The evaporator 73 and the condenser 72 may be installed in the heat exchange duct 52. The evaporator 73 and the condenser 72 may be installed inside the heat exchange duct 52 to be spaced apart by a predetermined distance. The condenser 72 may be installed at a downstream of the evaporator 73 in a circulating direction of the airflow.

The evaporator 73 may be installed to be adjacent to the inlet duct 51, and may remove the moisture by cooling humid air discharged from the tub 20.

The condenser 72 may be installed to be adjacent to the supply duct 53, and may heat the air passed through the evaporator 73. Accordingly, the high temperature dry air may be discharged into the diaphragm 25 by the blower fan 41.

The compressor 71 may be installed at the outside of the upper duct 50, that is, the supply duct 53 above the tub 20. In other words, the compressor 71 may be installed in the space 44 between the supply duct 53 and the rear surface of the tub 20. The refrigerant pipe 45 may be installed in the space 44 formed by the inlet duct 51, the heat exchange duct 52, the supply duct 53, and the rear surface of the tub 20 above the tub 20.

The inlet duct 51, the heat exchange duct 52, the supply duct 53, the rear duct 55, and the blow duct 54 may respectively form an inlet flow path, a heat exchange flow path, a supply flow path, a rear flow path, and a blow flow path.

For example, an inner space of the inlet duct 51 may form the inlet flow path, an inner space of the heat exchange duct 52 may form the heat exchange flow path, and an inner space of the supply duct 53 may form the supply flow path. In addition, an inner space of the rear duct 55 may form the rear flow path, and an inner space of the blow duct 54 may form the blow flow path.

The inlet flow path, the heat exchange flow path, and the supply flow path may form an upper flow path which is provided above the tub 20. Accordingly, the tub 20, the rear flow path provided at the rear surface of the tub 20, the upper flow path provided above the tub 20, and the blow flow path provided at the front surface of the tub 20 may form a circulating flow path.

Accordingly, when the blower fan 41 disposed in the blow flow path is operated, the air inside the drum 30 may circulate along the circulating flow path.

Hereinafter, the upper duct 50 of the washing machine with drying function 1 according to an embodiment will be described in detail with reference to FIGS. 9 to 12.

Figure 9:
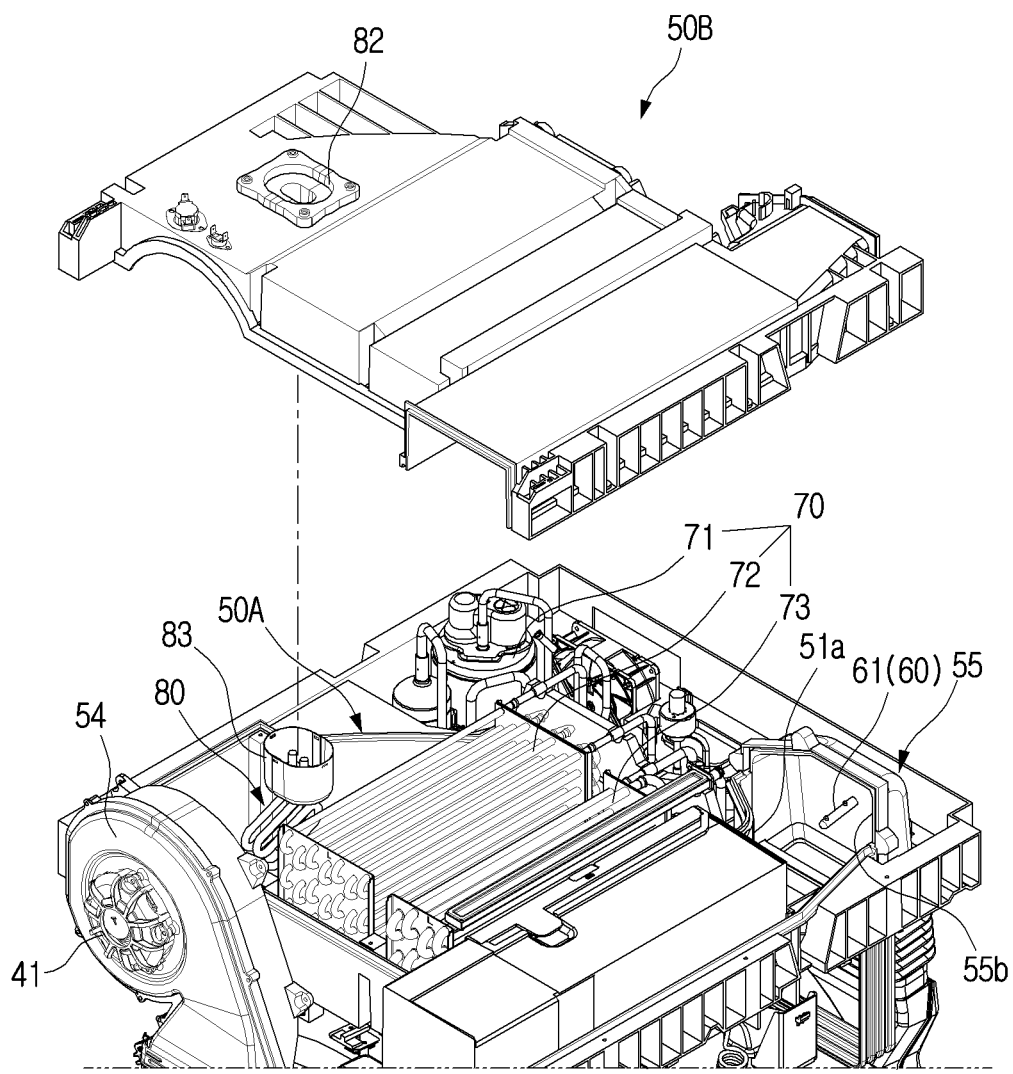
FIG. 9 is a perspective view illustrating a state in which a duct cover is separated from an upper duct of the heated air supplying device of FIG. 5 according to an embodiment.
Figure 10:
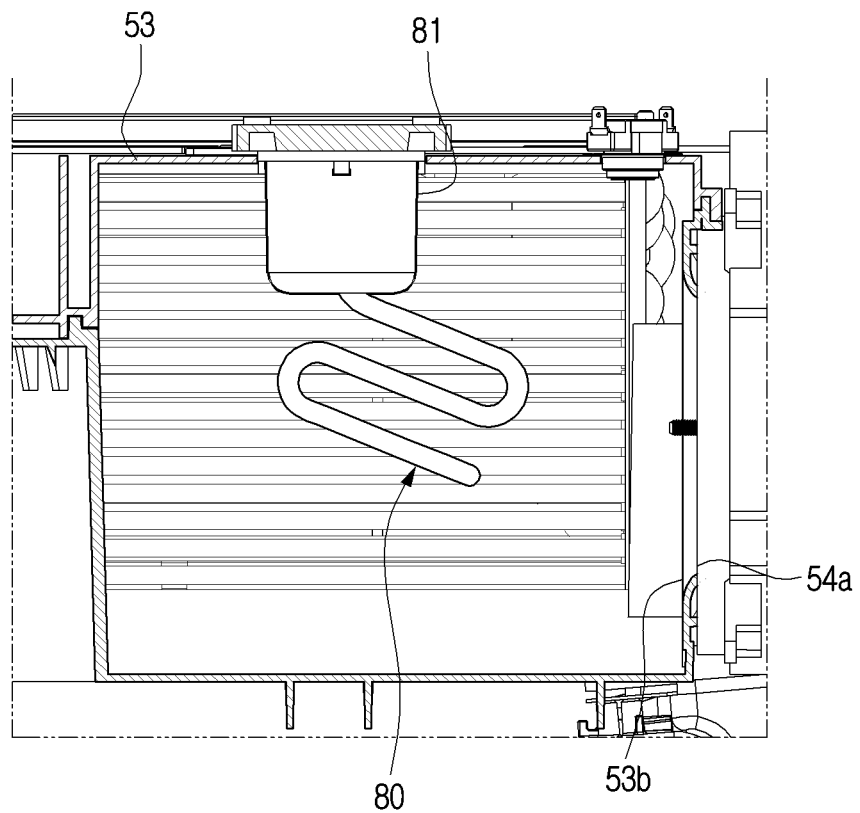
FIG. 10 is a partial cross-sectional view of an upper duct of the heated air supplying device of FIG. 5 taken along line I-I according to an embodiment.
Figure 11:
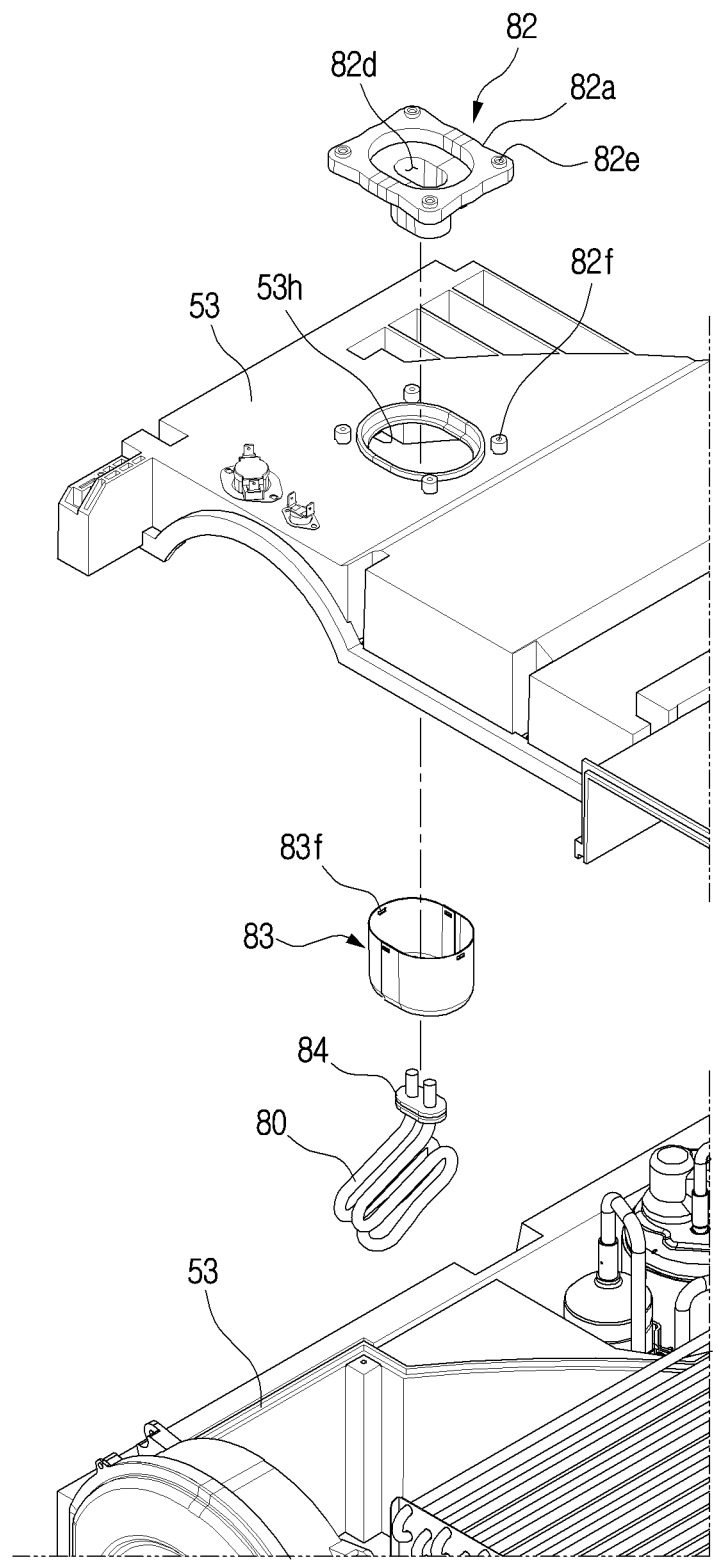
FIG. 11 is a partial perspective view illustrating a heater disposed in an upper duct of the heated air supplying device of FIG. 5 according to an embodiment.
Figure 12:
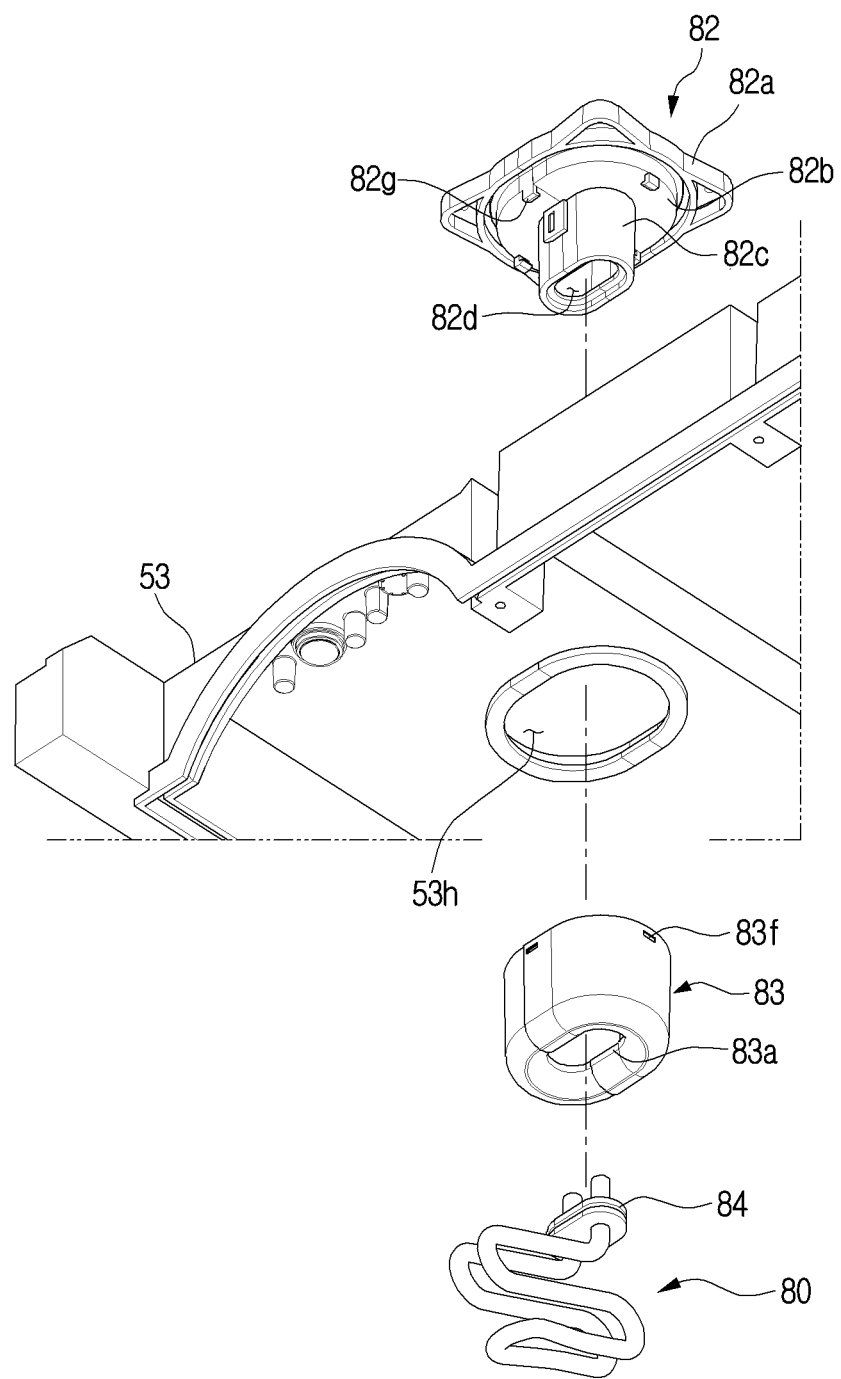
FIG. 12 is a partial bottom exploded perspective view illustrating a heater holder of FIG. 11 according to an embodiment.

FIG. 9 is a perspective view illustrating a state in which a duct cover is separated from an upper duct of the heated air supplying device of FIG. 5. FIG. 10 is a partial cross-sectional view of an upper duct of the heated air supplying device of FIG. 5 taken along line I-I. FIG. 11 is a partially exploded perspective view illustrating a heater disposed in an upper duct of the heated air supplying device of FIG. 5. FIG. 12 is a partial bottom exploded perspective view illustrating a heater holder of FIG. 11.

Referring to FIGS. 5, 6 and 9, the upper duct 50 of the washing machine with drying function 1 according to an embodiment may include the inlet duct 51, the heat exchange duct 52, and the supply duct 53.

The inlet duct 51 may have a rectangular cross-section, and the rear end thereof may be connected to the rear duct 55. In other words, the inlet 51a may be provided at the rear surface of the inlet duct 51. The inlet duct 51 may be installed to be adjacent to the one side of the tub 20 above the tub 20. The inlet duct 51 may be installed so that the front surface of the inlet duct 51 is adjacent to the front surface 21 of the tub 20 and the rear surface thereof is adjacent to the rear surface of the tub 20.

The outlet 51b may be provided at the one side surface of the inlet duct 51. The outlet 51b of the inlet duct 51 may be greater than the inlet 51a thereof. The outlet 51b of the inlet duct 51 may be formed to have a shape and size that corresponds to the inlet 52a of the heat exchange duct 52.

The outlet 51b of the inlet duct 51 and the inlet 52a of the heat exchange duct 52 may be formed in a rectangular shape. The width of the outlet 51b of the inlet duct 51 may be smaller than the length of the inlet duct 51.

The inlet 51a and the outlet 51b of the inlet duct 51 may be disposed at a right-angle.

The heat exchange duct 52 may have a rectangular cross-section, and both ends thereof may be opened. The heat exchange duct 52 may be formed to have as wide a cross-sectional area as possible to maximize the heat transfer area.

The inlet 52a and the outlet 52b of the heat exchange duct 52 may be formed to have a cross-section that is the same as the cross-section of the heat exchange duct 52. The heat exchange duct 52 may be disposed at a right-angle with the inlet duct 51.

The outlet 52b of the heat exchange duct 52 may be provided to face the inlet 52a of the heat exchange duct 52. In other words, the outlet 52b and the inlet 52a of the heat exchange duct 52 may be disposed in a straight line.

The evaporator 73 and the condenser 72 of the heat exchange part 70 may be installed inside the heat exchange duct 52. Accordingly, the airflow that flows through the heat exchange duct 52 may sequentially pass through the evaporator 73 and the condenser 72.

The supply duct 53 may have a rectangular cross-section, and the outlet 53b thereof may be provided at the front end of the supply duct 53. The outlet 53b of the supply duct 53 may be formed to have a shape and size corresponding to the inlet 54a of the blow duct 54.

The supply duct 53 may be disposed at a right-angle with respect to the heat exchange duct 52.

The supply duct 53 may be disposed opposite to the inlet duct 51 based on the heat exchange duct 52. In other words, the inlet duct 51 may be disposed at the one end of the heat exchange duct 52, and the supply duct 53 may be disposed at the other end of the heat exchange duct 52.

The inlet 53a may be provided at the one side surface of the supply duct 53. The inlet 53a of the supply duct 53 may be formed to have a shape and size corresponding to the outlet 52b of the heat exchange duct 52. For example, the inlet 53a of the supply duct 53 and the outlet 52b of the heat exchange duct 52 may be formed in a rectangular shape. The supply duct 53 may be formed to have a length that is roughly the same as the width of the heat exchange duct 52.

The inlet 53a and the outlet 53b of the supply duct 53 may be disposed at a right-angle.

The supply duct 53 may include an inclined surface. For example, the supply duct 53 may include the inclined surface 53d1 that connects the rear surface and the other side surface of the supply duct 53. The airflow introduced into the inlet 53a of the supply duct 53 may collide with the inclined surface 53d1, and then may be discharged through the outlet 53b of the supply duct 53.

As another example, the inclined surface 53d1 may be formed as a curved surface which can change a moving direction of the airflow introduced into the inlet 53*a* by approximately 90 degrees and guide to the outlet 53*b*.

The supply duct 53 may be formed to have a size corresponding to the suction hole of the blower fan 41. For example, the height of the supply duct 53 may be greater than the height of the heat exchange duct 52. At this time, because the supply duct 53 is positioned to be adjacent to the other side of the tub 20, the supply duct 53 may be formed to be higher than the height of the heat exchange duct 52 which is positioned at a center of a width direction of the tub 20. In other words, because the supply duct 53 is biased to one side from the center of the width direction of the tub 20 having a cylindrical shape, the height of the supply duct 53 may be made higher than the heat exchange duct 52 which is positioned at the center of the width direction.

The upper surface of the supply duct 53 may be formed on roughly the same plane as the upper surface of the heat exchange duct 52. The lower surface of the supply duct 53 may be formed to be positioned below the lower surface 52*c* of the heat exchange duct 52.

The side surface 53*d* of the supply duct 53 may be formed to connect the upper surface and the lower surface 53*c*1. The inclined surface 53*d*1 which is extended from the side surface 53*d* of the supply duct 53 may be formed to connect the upper surface and the lower surface.

The front surface of the inlet duct 51, the front surface of the heat exchange duct 52, and the front surface of the supply duct 53 may be positioned on roughly the same plane. In other words, the front surface of the inlet duct 51, the front surface of the heat exchange duct 52, and the front surface of the supply duct 53 may form the front surface of the upper duct 50.

The inlet duct 51, the heat exchange duct 52, and the supply duct 53 may be formed as one body. In other words, the inlet duct 51, the heat exchange duct 52, and the supply duct 53 may be formed as one body to form the upper duct 50.

As shown in FIG. 9, the upper duct 50 may include a duct body 50A and a duct cover 50B. The duct body 50A may be formed in a U-shape with a flat bottom and an upper surface thereof may be opened. The duct cover 50B may be formed to cover the upper surface of the duct body 50A. In other words, the duct cover 50B is coupled to the upper surface of the duct body 50A, thereby forming the upper duct 50.

When the duct cover 50B is opened, the evaporator 73, the condenser 72, and the heater 80 may be installed inside the duct body 50A.

The heater 80 may be installed inside the supply duct 53. In other words, the heater 80 may be disposed at a downstream of the condenser 72 based on the circulating direction of air. Accordingly, the heater 80 may secondarily heat the air heated by the condenser 72.

The heater 80 may be formed to heat the air that passes through the supply duct 53.

A heater that is small in size and has a large heat generating ability may be used as the heater 80. In other words, a heater with a large heat generating ability per unit area may be used as the heater 80. For example, a sheath heater may be used as the heater 80.

The heater 80 may be formed to minimize the flow resistance. For example, the heater 80 may be formed in a shape in which a cross-section area is minimized in the air flowing direction. To this end, a sheath heater 80 having a circular pipe shape may be bent several times to form the heater 80.

The heater 80 may be installed on one surface of the supply duct 53. In this embodiment, as illustrated in FIG. 10, the heater 80 may be installed on the upper surface of the supply duct 53. In other words, the heater 80 may be disposed in a portion of the duct cover 50B that forms the upper portion of the supply duct 53.

Figure 13:
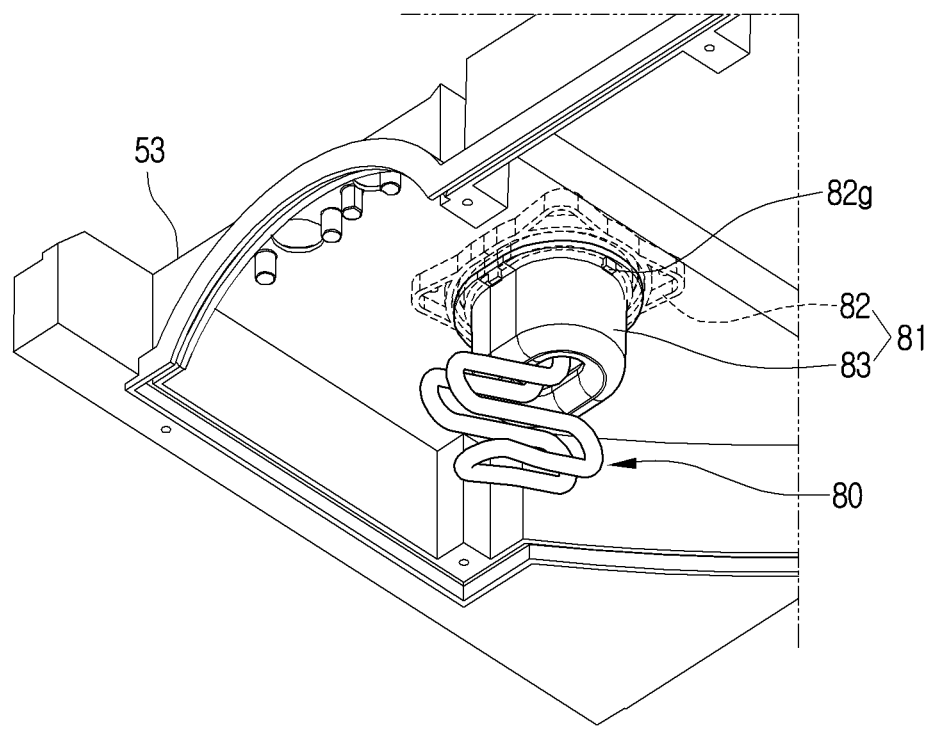
FIG. 13 is a perspective view illustrating a heater and a heater holder used in a heated air supplying device of a washing machine with drying function according to an embodiment.

FIG. 13 is a perspective view illustrating a heater and a heater holder used in a heated air supplying device of a washing machine with drying function according to an embodiment.

Referring to FIGS. 12 and 13, the heater 80 may be fixed to the upper surface of the supply duct 53 by the heater holder 81.

The heater holder 81 may be formed to fix the heater 80 to the upper surface of the supply duct 53. The heater holder 81 may include an upper holder 82 and a lower holder 83.

The upper holder 82 may be disposed on the upper side of the upper surface of the supply duct 53.

The upper holder 82 may include a fixing plate 82*a*, a step portion 82*b* that protrudes from the lower surface of the fixing plate 82*a* and is inserted into a fixing hole 53*h*, and an extension portion 82*c* extending downward from the lower surface of the step portion 82*b*. A through-hole 82*d* penetrating through the upper surface from the lower surface may be provided in the center of the upper holder 82. In other words, the through-hole 82*d* may be formed to penetrate the fixing plate 82*a* and the extension portion 82*c*. A wire for supplying power to the heater 80 may be provided in the through-hole 82*d*.

The upper holder 82 may be installed on the upper surface of the supply duct 53 with a plurality of bolts. To this end, a plurality of bolt holes 82*e* may be provided in the fixing plate 82*a*, and a plurality of fixing protrusions 82*f* may be provided on the upper surface of the supply duct 53 around the fixing-hole 53*h*. The plurality of fixing protrusions 82*f* may be provided with female threads.

The lower holder 83 may be installed on the lower side of the upper surface of the supply duct 53, and coupled to the upper holder 82. The lower holder 83 may be formed in a hollow, and a heater fixing hole 83*a* to which the heater 80 is fixed may be provided on the lower surface of the lower holder 83.

The upper holder 82 and the lower holder 83 may be coupled to each other in a one-touch manner. For example, a plurality of hooks 82*g* may be provided on the lower surface of the step portion 82*b* of the upper holder 82, and a plurality of locking grooves 83*f* corresponding to the plurality of hooks 82*g* may be provided on the upper end of the lower holder 83. Thus, the upper holder 82 and the lower holder 83 may be coupled with one touch by the plurality of hooks 82*g* and the plurality of locking grooves 83*f*.

However, the coupling method of the upper holder 82 and the lower holder 83 is not limited thereto. For example, the upper holder 82 and the lower holder 83 may be coupled with a plurality of screws.

The heater 80 may be formed by forming a U-shape with a narrow width by folding the sheath heater having a predetermined length in half, and bending the sheath heater bent in the U-shape twice to the U-shape with the narrow width to the upper side.

A fixing bracket 84 for fixing the heater 80 may be installed at one end of the heater 80. The fixing bracket 84 may be formed to be coupled to the heater fixing hole 83*a* of the lower holder 83.

When the heater 80 is fixed to the upper surface of the supply duct 53, the heater 80 protrudes into the supply duct 53, and the electric wire connected to the heater 80 may be disposed on the outside of the supply duct 53 through the heater holder 81.

Because the supply duct 53 is formed of an injection product of plastic or resin, the supply duct 53 may be deformed or ignited by heat generated by the heater 80. Accordingly, the heater 80 may be disposed in the center of the supply duct 53 to prevent the supply duct 53 from being deformed or ignited by the heat generated by the heater 80. In other words, in order to prevent the supply duct 53 from being deformed or ignited by the heat generated by the heater 80, the heater 80 may be disposed to be spaced apart from the upper surface, the lower surface, and the side surfaces of the supply duct 53 by a predetermined distance.

Figure 14:
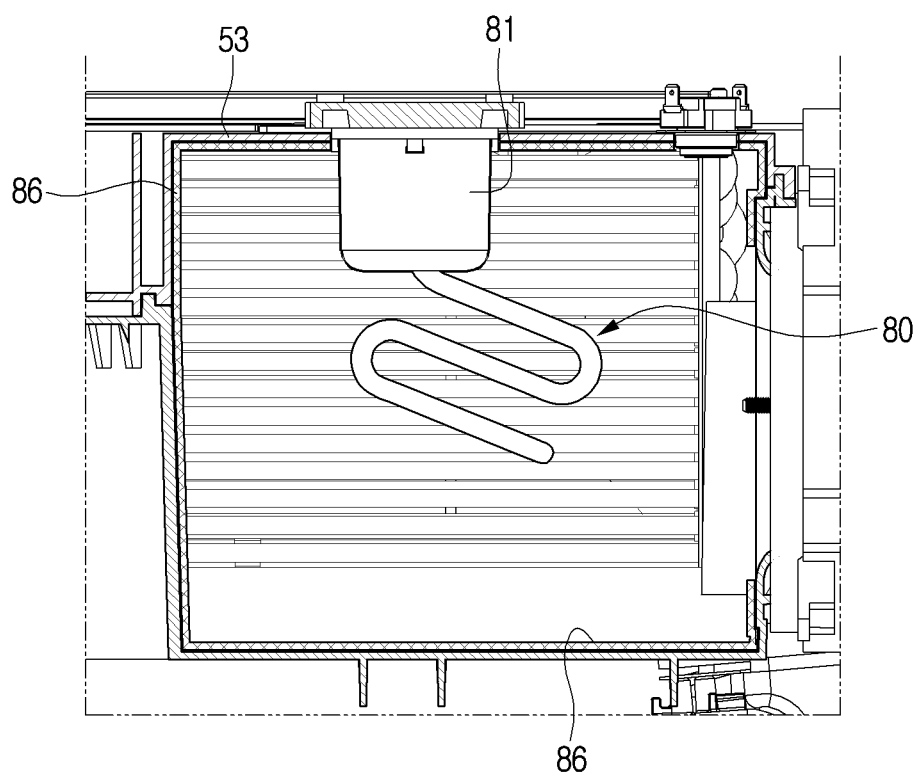
FIG. 14 is a view illustrating a case in which a barrier is disposed in a supply duct of a heated air supplying device of a washing machine with drying function according to an embodiment.

Alternatively, in order to prevent the supply duct 53 from being deformed or ignited by the heat generated by the heater 80, a barrier 86 may be provided inside the supply duct 53 as illustrated in FIG. 14.

FIG. 14 is a view illustrating a case in which a barrier is disposed in a supply duct of a heated air supplying device of a washing machine with drying function according to an embodiment.

Referring to FIG. 14, the barrier 86 may be disposed on the inner surface of the upper surface, the inner surface of the lower surface, and the inner surfaces of the side surfaces of the supply duct 53. The barrier 86 may be formed to have a size corresponding to the inner surface of the upper surface, the inner surface of the lower surface, and the inner surfaces of the side surfaces of the supply duct 53.

The barrier 86 may be formed of a metallic material to prevent ignition. For example, the barrier 86 may be formed of an iron plate, an aluminum plate, or an aluminum foil.

When the barrier 86 is provided inside the supply duct 53 in this way, the barrier 86 may block the heat generated by the heater 80. Accordingly, when the heater 80 is disposed adjacent to the inner surface of the supply duct 53, the barrier 86 may prevent the supply duct 53 from being deformed or ignited by the heat of the heater 80.

In the above-description, the inlet duct 51, the heat exchange duct 52, and the supply duct 53 are formed as a single body. However, as another embodiment, the inlet duct 51, the heat exchange duct 52, and the supply duct 53 may be formed separately.

In this case, each of the inlet duct 51, the heat exchange duct 52, and the supply duct 53 may be formed to have a body having an open upper surface and a cover covering the upper surface of the body in the same manner as the upper duct 50 described above.

In detail, the inlet duct 51 may be composed of an inlet duct body having an open upper surface and an inlet duct cover covering the upper surface of the inlet duct body. The heat exchange duct 52 may be composed of a heat exchange duct body having an open upper surface and a heat exchange duct cover covering the upper surface of the heat exchange duct body. In addition, the supply duct 53 may be composed of a supply duct body having an open upper surface and a supply duct cover covering the upper surface of the supply duct body.

By forming in this way, the supply duct cover, the heat exchange duct cover, and the inlet duct cover may be opened separately. In other words, the supply duct may be opened, and the heater 80 may be disposed in the supply duct body. In addition, the heat exchange duct cover may be opened, and the evaporator 73 and the condenser 72 may be disposed in the heat exchange duct body. Also, the inlet duct cover may be opened, and the lint caught in the lint filter 42 may be removed.

Hereinafter, a dehumidifier 60 disposed in the rear duct 55 will be described in detail with reference to FIGS. 15 to 17.

Figure 15:
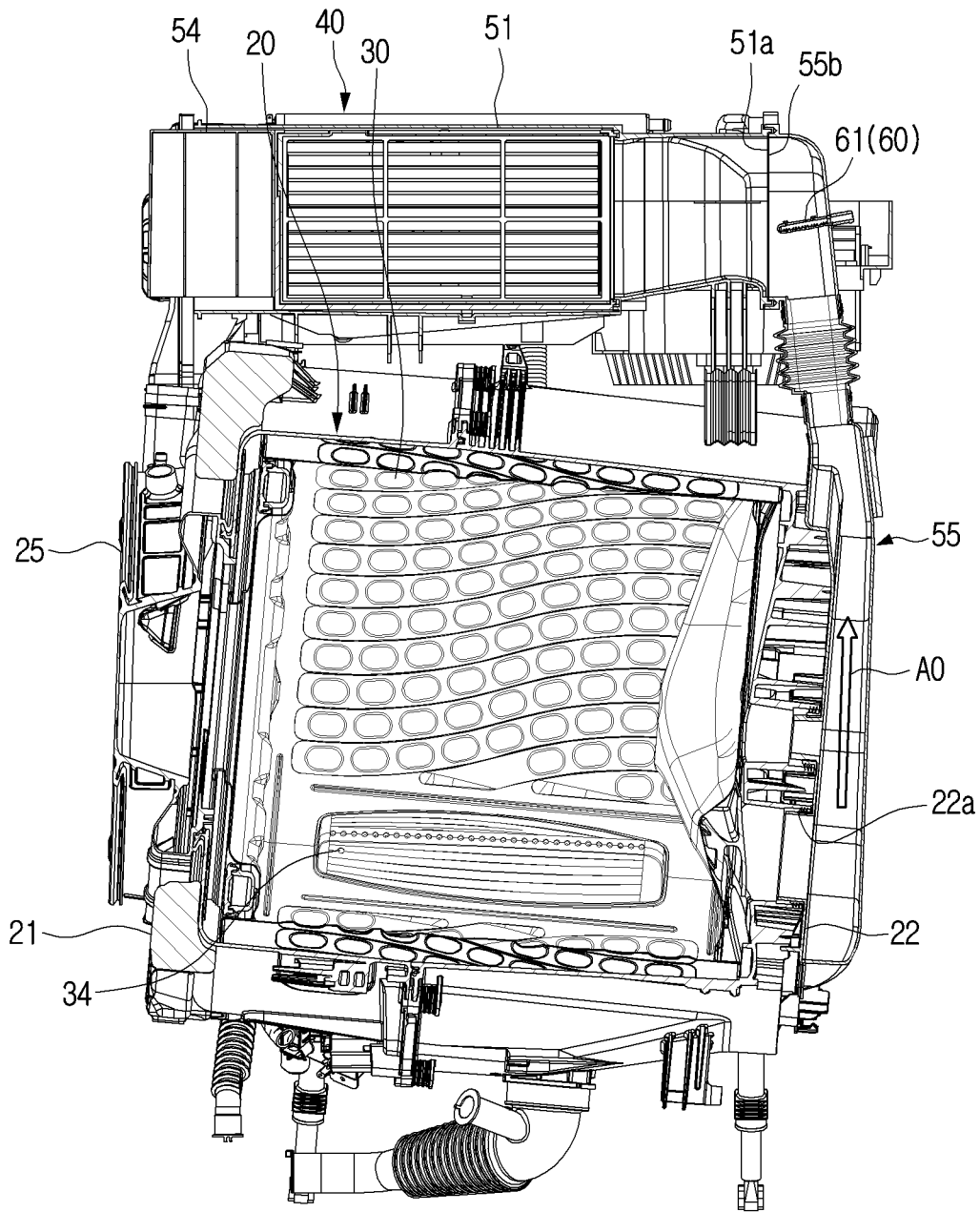
FIG. 15 is a cross-sectional view of the heated air supplying device of FIG. 5 taken along line II-II according to an embodiment.

FIG. 15 is a cross-sectional view of the heated air supplying device of FIG. 5 taken along line II-II. FIG. 16 is a perspective view illustrating a direct water nozzle of a heated air supplying device of a washing machine with drying function according to an embodiment. FIG. 17 is a partial cross-sectional view illustrating a state in which a direct water nozzle of a heated air supplying device of a washing machine with drying function according to an embodiment sprays water.

Referring to FIG. 15, the dehumidifier 60 may include a direct water nozzle 61.

The direct water nozzle 61 may be disposed at the upper portion of the rear duct 55. The direct water nozzle 61 may be disposed adjacent to the outlet 55b of the rear duct 55. The direct water nozzle 61 may be formed to spray water toward the lower portion of the rear duct 55.

The direct water nozzle 61 may be connected to the water supply pipe 27. The water supply pipe 27 is formed to supply wash water to the drum 30. The direct water nozzle 61 may be connected to the water supply pipe 27 through a connection pipe 62. Accordingly, water flowing through the water supply pipe 27 may be supplied to the direct water nozzle 61 through the connection pipe 62.

A nozzle fixing hole 55h into which the direct water nozzle 61 is inserted may be provided on the rear surface of the rear duct 55.

Figure 16:
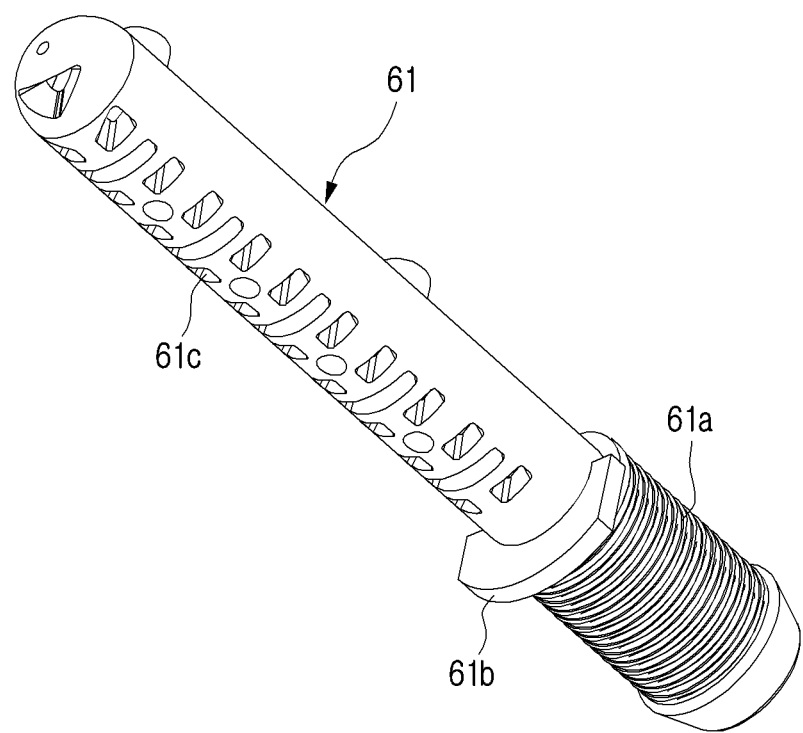
FIG. 16 is a perspective view illustrating a direct water nozzle of a heated air supplying device of a washing machine with drying function according to an embodiment.

Referring to FIG. 16, the direct water nozzle 61 may be formed in a pipe shape. The direct water nozzle 61 has a circular cross-section. One end of the direct water nozzle 61 is open and the other end thereof is closed.

One end portion of the direct water nozzle 61 may be provided with a screw portion 61a to connect the connection pipe 62. A stopper 61b may be provided at one side of the screw portion 61a to limit the length of the direct water nozzle 61 being inserted into the rear duct 55 through the nozzle fixing hole 55h.

In addition, a plurality of nozzle holes 61c are formed on the lower portion of the direct water nozzle 61. The plurality of nozzle holes 61c may be formed in the longitudinal direction of the direct water nozzle 61. The plurality of nozzle holes 61c may be provided between the stopper 61b and the other end of the direct water nozzle 61. The plurality of nozzle holes 61c may be formed to spray water toward the lower portion of the rear duct 55.

The direct water nozzle 61 may be disposed in the nozzle fixing hole 55h of the rear duct 55 so that the plurality of nozzle holes 61c face downward. Then, the water suppled to the direct water nozzle 61 may be sprayed toward the lower portion of the rear duct 55.

Figure 17:
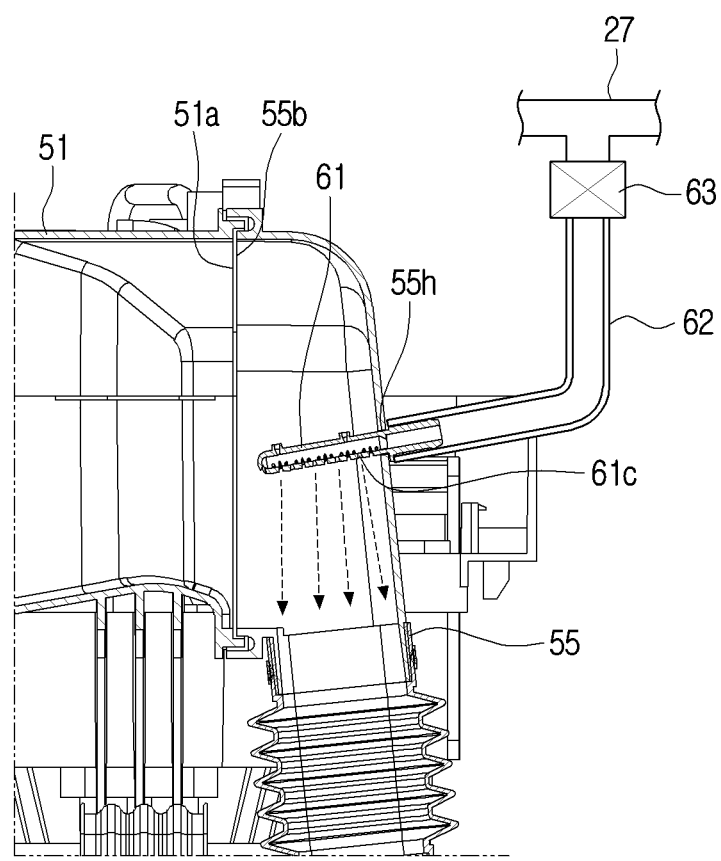
FIG. 17 is a partial cross-sectional view illustrating a state in which a direct water nozzle of a heated air supplying device of a washing machine with drying function according to an embodiment sprays water.

As illustrated in FIG. 17, a dehumidifying valve 63 configured to selectively open and close the direct water nozzle 61 may be disposed in the connection pipe 62. In other words, the dehumidifying valve 63 may be disposed between the direct water nozzle 61 and the water supply pipe 27. The processor 90 may control the dehumidifying valve 63 to selectively supply water to the direct water nozzle 61.

Accordingly, in the case that water flows through the water supply pipe 27, when the dehumidifying valve 63 is opened, the water in the water supply pipe 27 is supplied to the direct water nozzle 61. Then, as illustrated in FIG. 17, the water is sprayed toward the lower portion of the rear duct 55 through the plurality of nozzle holes 61c of the direct water nozzle 61.

When the water is injected into the rear duct 55 by the direct water nozzle 61, the moisture contained in the air A0 moving from the lower portion of the rear duct 55 to the upper portion thereof is condensed by the water, and then falls to the lower portion of the rear duct 55. Accordingly, the direct water nozzle 61 may remove moisture from the air passing through the rear duct 55.

Hereinafter, a drying process of the washing machine 1 with drying function according to an embodiment of the disclosure having the above-described structure will be described in detail.

The washing machine 1 with drying function according to an embodiment may perform a washing process, a rinsing process, a dehydrating process, etc. in the same manner as a washing machine according to the related art. Therefore, descriptions thereof are omitted.

When the drying process starts, the processor 90 of the washing machine 1 operates the blower fan 41, the compressor 71 of the heat exchange part 70, the dehumidifier 60, and the heater 80.

When the compressor 71 is operated, refrigerant circulates between the compressor 71, the condenser 72, the expansion valve 74, and the evaporator 73. In this case, the evaporator 73 and the condenser 72 are disposed in the heat exchange duct 52. The condenser 72 is disposed downstream of the evaporator 73 in the air circulation direction.

When the blower fan 41 is operated, the air in the drum 30 circulates through the rear duct 55, the inlet duct 51, the heat exchange duct 52, the supply duct 53, the blower fan 41, and the blow duct 54, thereby drying the laundry.

In detail, the humid air in the drum 30 is discharged into the space between the rear plate 32 of the drum 30 and the rear plate 22 of the tub 20 through the plurality of through holes of the rear plate 32 of the drum 30. The humid air discharged between the rear plate 32 of the drum 30 and the rear plate 22 of the tub 20 is introduced into the rear duct 55 through the rear opening 22a of the tub 20.

The humid air A0 introduced into the rear duct 55 is discharged to the inlet duct 51 through the outlet 55b.

Because the dehumidifier 60 is provided in the rear duct 55, moisture contained in the humid air passing through the rear duct 55 may be removed.

In detail, when the processor 90 opens the dehumidifying valve 63 of the dehumidifier 60, water is supplied from the water supply pipe 27 to the direct water nozzle 61. Then, the water is sprayed toward the lower portion of the rear duct 55 through the direct water nozzle 61. When the water is sprayed by the direct water nozzle 61, moisture contained in the air passing through the rear duct 55 is condensed and falls to the lower portion of the rear duct 55 together with the sprayed water. Then, the air from which moisture has been removed by the dehumidifier 60 enters the inlet duct 51.

The air A1, from which moisture has been primarily removed by the dehumidifier 60, introduced into the inlet 51a of the inlet duct 51 flows in a direction perpendicular to the front cover 11 of the cabinet 10, that is, the front surface 21 of the tub 20. The air introduced into the inlet duct 51 is discharged to the heat exchange duct 52 through the lint filter 42. In this case, foreign substances such as lint contained in the air may be filtered out by the lint filter 42.

The air introduced into the inlet 52a of the heat exchange duct 52 flows in a direction parallel to the front cover 11 of the cabinet 10. In other words, the air A2 flowing through the heat exchange duct 52 is perpendicular to the air A1 flowing through the inlet duct 51.

The air, from which moisture has been primarily removed by the dehumidifier 60, introduced into the inlet 52a of the heat exchange duct 52 passes through the evaporator 73, so that moisture is secondarily removed from the air. The air secondarily dehumidified by the evaporator 73 is heated while passing through the condenser 72. Accordingly, from the outlet 52b of the heat exchange duct 52, high-temperature dry air is discharged to the supply duct 53.

The air, which is primarily heated by the condenser 72, introduced into the inlet 53a of the supply duct 53 flows in a direction perpendicular to the front cover 11 of the cabinet 10. In other words, the air A3 flowing through the supply duct 53 is perpendicular to the air A2 flowing through the heat exchange duct 52 and parallel to the air A1 flowing through the inlet duct 51.

The air, which is primarily heated by the condenser 72, introduced into the supply duct 53 is secondarily heated by the heater 80.

At the beginning of the drying process, that is, before the condenser 72 of the heat exchange part 70 heats the air to 90 degrees (° C.) or more, the heater 80 heats the air introduced into the supply duct 53. When the condenser 72 heats the air to 90 degrees (° C.) or more, that is, after the preheating of the heat exchange part 70 is completed, both the condenser 72 and the heater 80 may heat the air.

Alternatively, when the preheating of the heat exchange part 70 is completed, the heater 80 is turned off, and only the condenser 72 of the heat exchange part 70 may heat the air.

The air discharged from the outlet 53b of the supply duct 53 flows into the suction hole of the blower fan 41, that is, the inlet 54a of the blow duct 54. At this time, because the outlet 53b of the supply duct 53 and the inlet 54a of the blow duct 54 are arranged on a straight line, flow resistance of the air flowing into the blower fan 41 may be minimized.

The blow duct 54 discharges the high-temperature dry air sucked into the inlet 54a thereof downward toward the diaphragm 25 through the outlet 54b thereof. At this time, the direction of the air discharged from the outlet 54b of the blow duct 54 is perpendicular to the direction of the air sucked into the inlet 54a thereof.

The high-temperature dry air, that is, heated air discharged from the outlet 54b of the blow duct 54 is introduced into the diaphragm 25 through the connecting part 26. In this case, because the outlet 54b of the blow duct 54 and the connecting part 26 are arranged on a straight line, the heated air discharged by the blower fan 41 flows into the inside of the diaphragm 25 in a straight line.

The diaphragm 25 communicates with the drum opening 31a provided on the front surface 31 of the drum 30, so that the heated air flows into the drum 30 through the diaphragm 25.

The heated air introduced into the drum 30 contacts the laundry and dries the laundry. The heated air, that is, high-temperature dry air, becomes low-temperature humid air by drying the laundry.

The humid air in the drum 30 is discharged to the rear duct 55 through the plurality of through holes in the rear surface 33 of the drum 30 to continue the above-mentioned circulation.

In the above description, as the dehumidifier 60 disposed in the rear duct 55, a water-cooled dehumidifier that uses water to remove moisture contained in air is used. However, the dehumidifier 60 is not limited thereto. Alternatively, the dehumidifier 60 may be formed as an air-cooling type.

Hereinafter, an air-cooled dehumidifier will be described in detail with reference to FIGS. 18 to 20.

Figure 18:
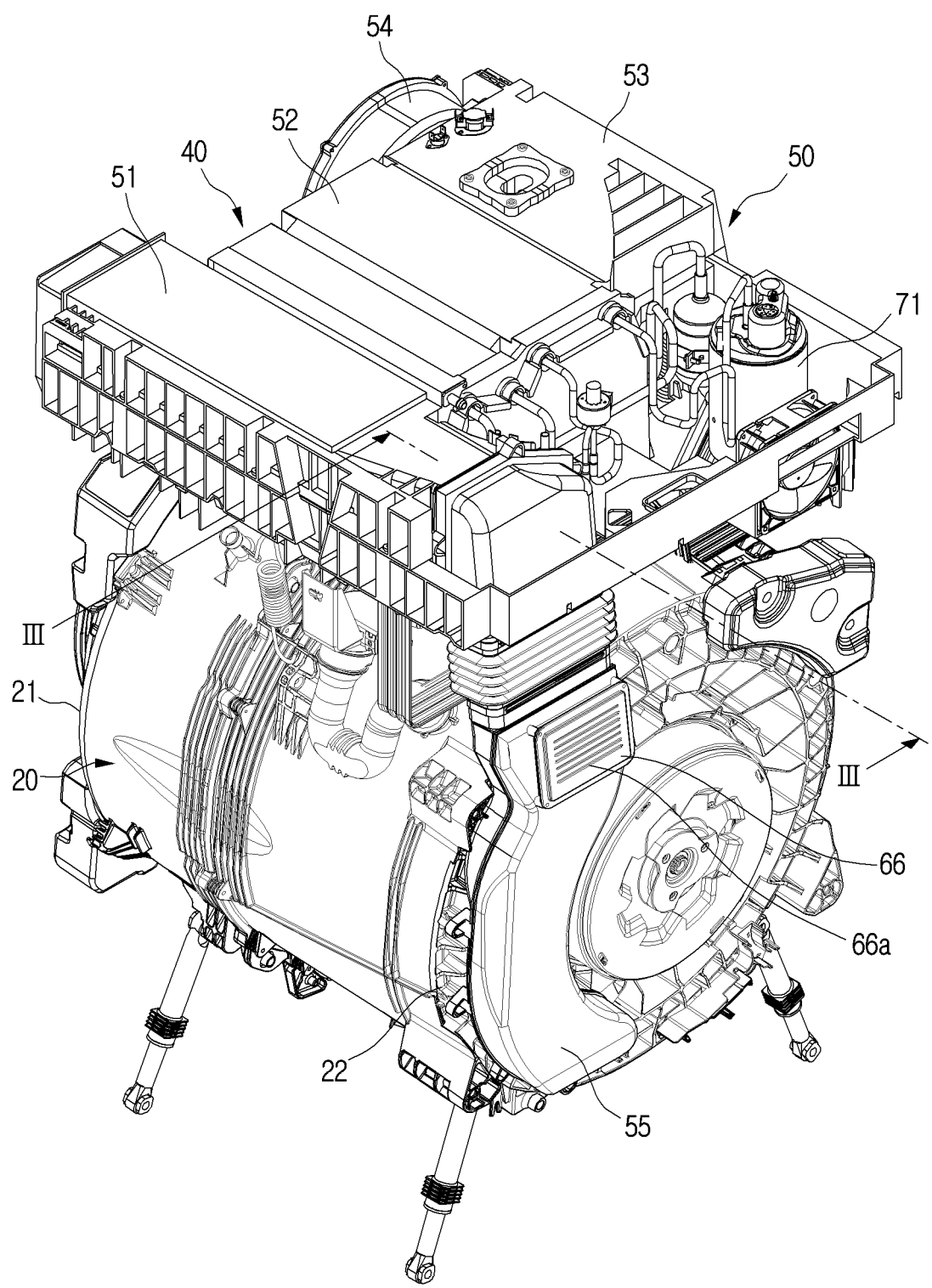
FIG. 18 is a rear perspective view illustrating a heated air supplying device of a washing machine with drying function according to an embodiment.

FIG. 18 is a rear perspective view illustrating a heated air supplying device of a washing machine with drying function according to an embodiment. FIG. 19 is a cross-sectional view of the heated air supplying device of FIG. 18 taken along line III-III. FIG. 20 is an exploded perspective view illustrating a dehumidifier of FIG. 18.

Figure 19:
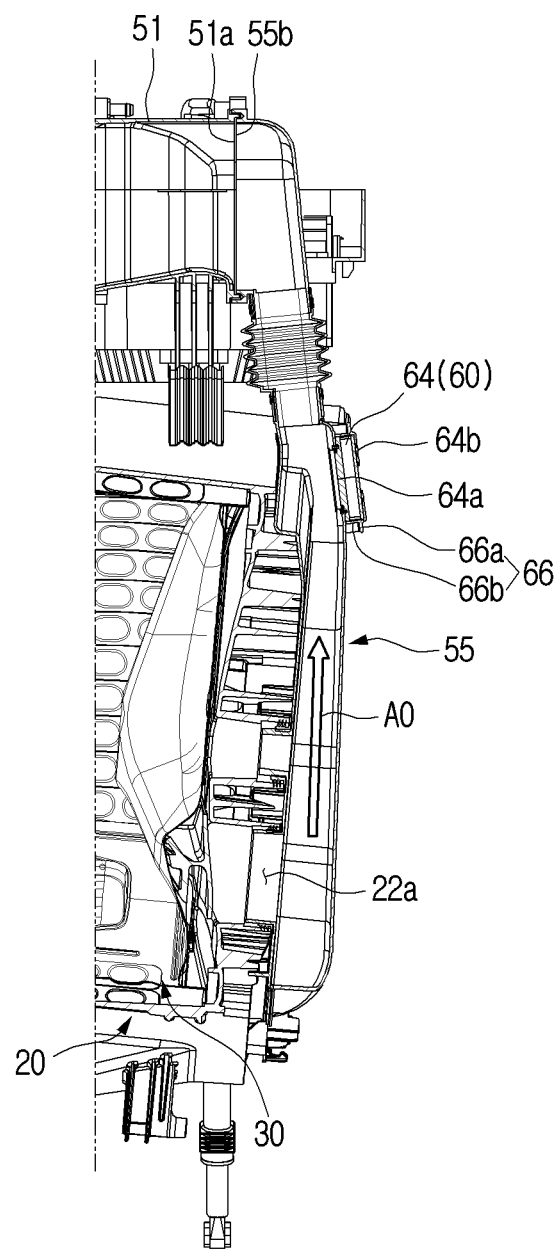
FIG. 19 is a cross-sectional view of the heated air supplying device of FIG. 18 taken along line III-III according to an embodiment.
Figure 20:
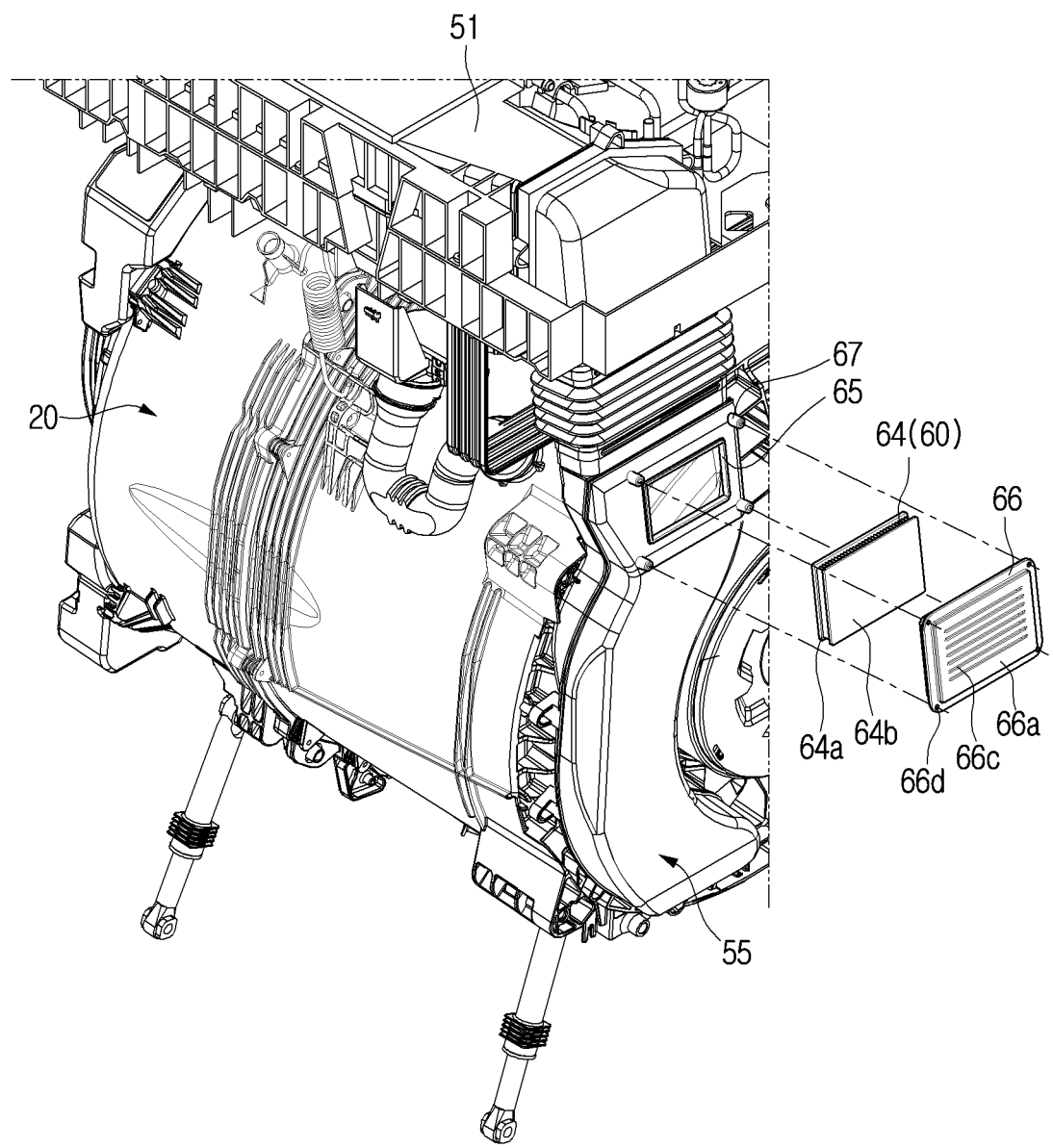
FIG. 20 is an exploded perspective view illustrating a dehumidifier of FIG. 18 according to an embodiment.

Referring to FIGS. 18 to 20, the dehumidifier 60 may include a Peltier element 64.

The Peltier element 64 is disposed in the rear duct 55 to cool the air passing through the rear duct 55. Then, moisture contained in the air may be condensed and removed by the Peltier element 64.

The Peltier element 64 may be disposed in the upper portion of the rear duct 55. For example, the Peltier element 64 may be disposed on the rear surface of the rear duct 55 at a height corresponding to the upper end of the tub 20. In other words, the Peltier element 64 may be disposed at a height at which the Peltier element 64 is not affected by wash water accommodated in the tub 20 during washing.

The rear duct 55 may include an opening 65 through which a cooling surface of the Peltier element 64 is exposed. In other words, the opening 65 corresponding to the cooling surface of the Peltier element 64 may be provided at the rear surface of the rear duct 55. Therefore, when the Peltier element 64 is disposed on the rear surface of the rear duct 55 so that the cooling surface of the Peltier element 64 is exposed to the inside of the rear duct 55 through the opening 65, air passing through the inner space of the rear duct 55 facing the cooling surface of the Peltier element 64 may be cooled.

The Peltier element 64 may include a low-temperature part and a high-temperature part. A temperature difference between the low-temperature part and the high-temperature part may be determined depending on a voltage applied to the Peltier element 64.

The Peltier element 64 may be disposed such that the low-temperature part faces the inside of the rear duct 55 and the high-temperature part faces the outside of the rear duct 55.

The Peltier element 64 may be provided with a cooling sink 64*a* and a heat sink 64*b*.

The cooling sink 64*a* may be disposed to be in contact with or adjacent to the exposed surface of the low-temperature part of the Peltier element 64, that is, the low-temperature surface. For example, the cooling sink 64*a* is disposed on the left side of the Peltier element 64 so as to face the inside of the rear duct 55. In other words, the cooling sink 64*a* is disposed inside the rear duct 55. Accordingly, one surface of the cooling sink 64*a* forms a cooling surface of the Peltier element 64 that cools the air passing through the rear duct 55.

The cooling sink 64*a* may be formed so as not to protrude into the rear duct 55. For example, the one surface of the cooling sink 64*a* may be formed to be flush with the inner surface of the rear surface of the rear duct 55. When the cooling sink 64*a* does not protrude into the inside of the rear duct 55, the cooling sink 64*a* may not obstruct the air passing through the rear duct 55.

The cooling sink 64*a* may be formed of a material having high thermal conductivity. The cooling sink 64*a* may be formed in a substantially rectangular plate shape.

The cooling sink 64*a* may be formed to include a cooling plate and a plurality of cooling fins. In this case, the plurality of cooling fins are exposed to the inside of the rear duct 55 and may cool the air by exchanging heat with the air passing through the rear duct 55. Then, moisture contained in the air passing through the rear duct 55 may be efficiently removed.

The heat sink 64*b* is disposed in contact with or adjacent to the exposed surface of the high-temperature part of the Peltier element 64, that is, the high-temperature surface. For example, the heat sink 64*b* is disposed on the right side of the Peltier element 64 so as to be exposed to the outside of the rear duct 55. The heat sink 64*b* is exposed to the outside of the rear duct 55, so that the heat sink 64*b* may be cooled by outside air. Therefore, the high-temperature part of the Peltier element 64 may be cooled by outside air passing through the heat sink 64*b*.

The heat sink 64*b* may be formed of a material having high thermal conductivity. The heat sink 64*b* may be formed in a substantially rectangular plate shape.

The heat sink 64*b* may be formed to include a heat dissipation plate and a plurality of heat dissipation fins. In this case, the plurality of heat dissipation fins may be exposed to the outside of the rear duct 55 and cooled by exchanging heat with air outside the rear duct 55. Then, the heat sink 64*b* may be effectively cooled by the outside air passing through the plurality of heat dissipation fins.

The Peltier element 64 may be secured to the rear duct 55 by a peltier cover 66. The peltier cover 66 may include a fixing portion 66*a* and a receiving portion 66*b*.

The fixing portion 66*a* may be formed to fix the peltier cover 66 to the rear duct 55. A plurality of fixing protrusions 67 for fixing the fixing portion 66*a* are provided on the rear surface of the rear duct 55. The plurality of fixing protrusions 67 may be formed around the opening 65. The fixing portion 66*a* is provided with a plurality of bolt holes 66*d*, and the plurality of fixing protrusions 67 are provided with female screws. Therefore, the peltier cover 66 may be disposed on the rear duct 55 using a plurality of screws.

A ventilation hole 66*c* may be provided on a surface of the fixing portion 66*a* facing the heat sink 64*b*. The ventilation hole 66*c* may be formed in a plurality of holes or slits. In this embodiment, the ventilation hole 66*c* is formed in a plurality of slits.

The receiving portion 66*b* may extend from one surface of the fixing portion 66*a* and may be formed to receive the Peltier element 64 and the heat sink 64*b*. The receiving portion 66*b* communicates with the ventilation hole 66*c* of the fixing portion 66*a*. Therefore, when the Peltier element 64 and the heat sink 64*b* are inserted into the receiving portion 66*b*, the heat sink 64*b* may come into contact with outside air through the ventilation hole 66*c* of the fixing portion 66*a*.

When the Peltier element 64 is operated by the processor 90, the temperature of the cooling surface of the Peltier element 64 is lowered. As a result, because the internal temperature of the rear duct 55 is lowered, moisture contained in the humid air passing through the rear duct 55 is condensed and falls downward in the rear duct 55 so as to be removed.

The washing machine 1 with drying function according to an embodiment described above may reduce drying time and energy by using the dehumidifier 60 provided in the rear duct 55 and the heater 80 provided in the supply duct 53.

Figure 21:
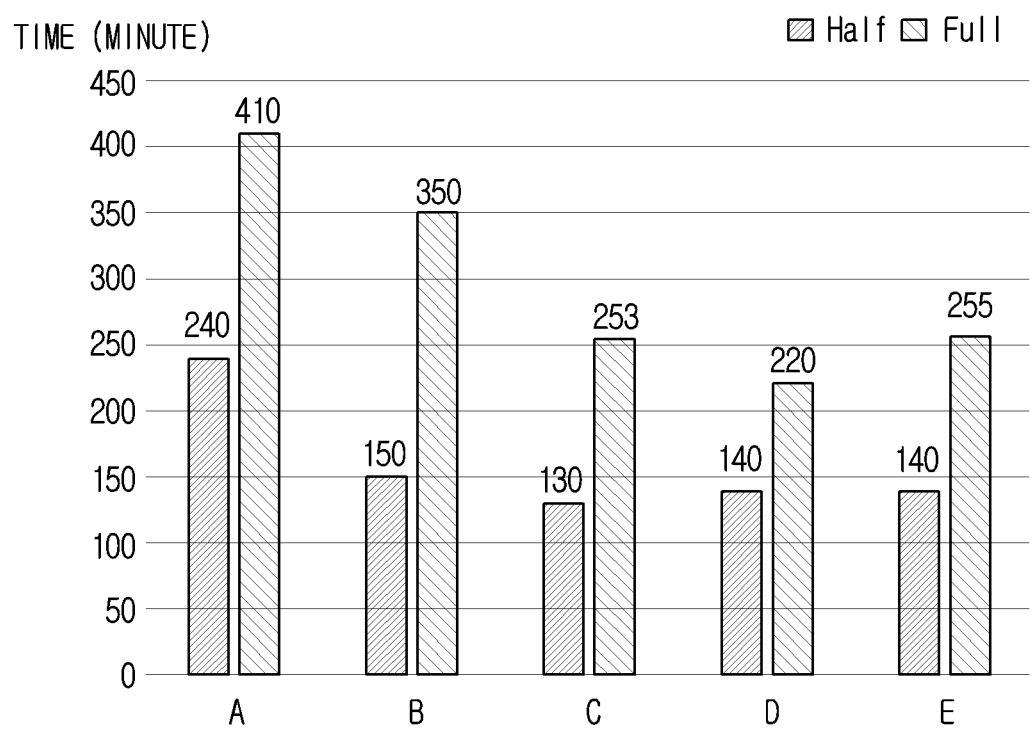
FIG. 21 is a graph comparing a drying time of a washing machine with drying function according to an embodiment with drying times of other dryers.

FIG. 21 is a graph comparing a drying time of a washing machine with drying function according to an embodiment with drying times of other dryers.

In FIG. 21, the vertical axis represents time, and the unit is minutes. The horizontal axis represents a washing machine with drying function according to an embodiment and other dryers. Half indicates a state in which half of the laundry capacity is accommodated in the drum, and Full indicates a state in which the laundry corresponding to the capacity is accommodated in the drum.

A and B respectively represent a commercially available washing machine with drying function using a heat pump. C represents a washing machine with drying function according to an embodiment. D represents a dedicated dryer using a heat pump. E represents a dedicated dryer using a heater.

Referring to FIG. 21, the drying time of the washing machine with drying function according to an embodiment is shorter than those of the dedicated dryer and other washing machines with drying function using a heat pump in the case of the half drying. In other words, the drying time of the washing machine with drying function according to an embodiment is 130 minutes, the drying time of the washing machine with drying function of A is 240 minutes, the drying time of the washing machine with drying function of B is 150 minutes, and the drying times of the dedicated dryers D and E are 140 minutes.

In addition, in the case of the full drying, the drying time of the washing machine with drying function according to an embodiment is shorter than those of other washing machines with drying function A and B using the heat pump, and similar to those of the dedicated dryers D and E using the heat pump and the heater, respectively.

Figure 22:
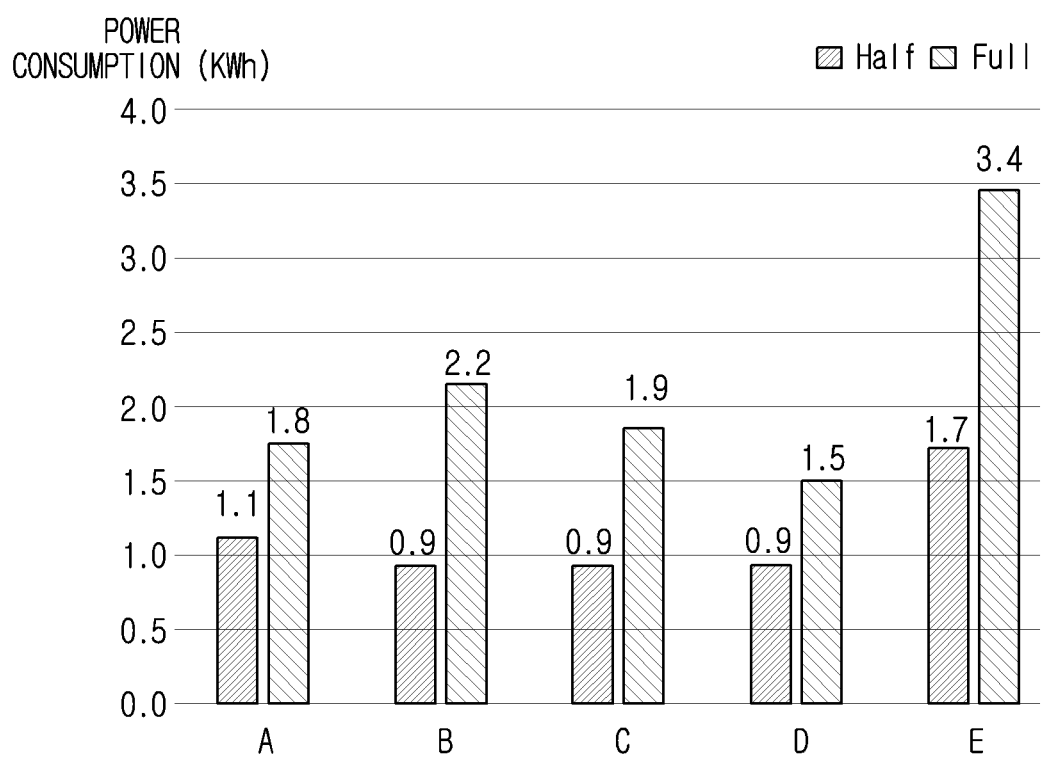
FIG. 22 is a graph comparing power consumption of a washing machine with drying function according to an embodiment with power consumption of other dryers.

FIG. 22 is a graph comparing power consumption of a washing machine with drying function according to an embodiment with power consumption of other dryers.

In FIG. 22, the vertical axis represents power consumption, and the unit is kilowatt hour (KWh). The horizontal axis represents a washing machine with drying function according to an embodiment and other dryers. Half indicates a state in which half of the laundry capacity is accommodated in the drum, and Full indicates a state in which the laundry corresponding to the laundry capacity is accommodated in the drum.

A and B respectively represent a commercially available washing machine with drying function using a heat pump. C represents a washing machine with drying function according to an embodiment. D represents a dedicated dryer using a heat pump. E represents a dedicated dryer using a heater.

Referring to FIG. 22, the power consumption of the washing machine with drying function according to an embodiment is similar to that of other washing machines with drying function A and B and the dedicated dryer D using the heat pump, and is less than that of the dedicated dryer E using the heater. Accordingly, the washing machine with drying function according to an embodiment may reduce energy consumption compared to the dedicated dryer using the heater.

As described above, the washing machine with drying function according to an embodiment mainly converts low-temperature humid air discharged from the drum into high-temperature dry air by using a heat exchange part. In addition, the washing machine with drying function according to an embodiment is supplementarily formed such that a dehumidifier is used to firstly remove moisture from low-temperature humid air discharged from a drum to increase the dehumidifying effect and a heater is used to secondarily heat the air that has passed through the heat exchange part to increase the heating effect. Accordingly, the washing machine with drying function according to an embodiment may have drying performance comparable to that of dedicated dryers.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A washing machine with drying function, comprising:
   a cabinet including a laundry insertion hole provided on a front surface of the cabinet;
   a tub disposed inside the cabinet and provided with a rear opening and a front opening;
   a drum rotatably disposed inside the tub, wherein the laundry insertion hole, the front opening, and the drum are positioned so that laundry is insertable through the laundry insertion hole and then through the front opening to be received in the drum; and
   a heated air supplying device including:
      a heat exchange duct disposed above the tub, and including an evaporator and a condenser,
      a rear duct disposed behind the tub,
      an inlet duct disposed between the rear duct and a first side of the heat exchange duct,
      a supply duct disposed on a second side of the heat exchange duct,
      a blower fan disposed in front of the tub and configured to generate an airflow that flows from the rear opening, then through the rear duct, then through the inlet duct, then through the heat exchange duct, then through the supply duct, and then to the front opening, and
      a dehumidifier disposed inside the rear duct and configured to remove moisture contained in the airflow passing through the rear duct.

2. The washing machine with drying function of claim 1, further comprising:
   a heater disposed inside the supply duct, and configured to generate heat to heat the airflow passing through the supply duct.

3. The washing machine with drying function of claim 1, wherein
   the dehumidifier includes a direct water nozzle disposed at an upper portion of the rear duct, the direct water nozzle being configured to spray water toward a lower portion of the rear duct.

4. The washing machine with drying function of claim 3, wherein the direct water nozzle is connected to a water supply pipe.

5. The washing machine with drying function of claim 4, further comprising:
   a dehumidifying valve provided between the direct water nozzle and the water supply pipe,
   wherein the dehumidifying valve is configured to open and close so as to selectively supply water from the water supply pipe to the direct water nozzle.

6. The washing machine with drying function of claim 1, wherein the dehumidifier includes a Peltier element disposed on an upper portion of the rear duct.

7. The washing machine with drying function of claim 6, wherein
   the Peltier element includes a cooling surface, and
   the rear duct includes an opening through which the cooling surface of the Peltier element is exposed.

8. The washing machine with drying function of claim 2, wherein the heater is fixed to an upper surface of the supply duct.

9. The washing machine with drying function of claim 8, further comprising:
   a heater holder configured to fix the heater to the upper surface of the supply duct.

10. The washing machine with drying function of claim 8, wherein the supply duct includes a barrier provided on an inner surface of the supply duct, the barrier being configured to block heat, generated by the heater, from the inner surface of the supply duct.

11. A washing machine with drying function, comprising:
a cabinet including a laundry insertion hole provided on a front surface of the cabinet;
a tub disposed inside the cabinet and provided with a rear opening and a front opening;
a drum rotatably disposed inside the tub, wherein the laundry insertion hole, the front opening, and the drum are positioned so that laundry is insertable through the laundry insertion hole and then through the front opening to be received in the drum; and
a heated air supplying device including:
a heat exchange duct disposed above the tub, and including an evaporator and a condenser,
a rear duct disposed behind the tub,
an inlet duct disposed between the rear duct and a first side of the heat exchange duct,
a supply duct disposed on a second side of the heat exchange duct,
a blower fan disposed in front of the tub and configured to generate an airflow that flows from the rear opening, then through the rear duct, then through the inlet duct, then through the heat exchange duct, then through the supply duct, and then to the front opening,
a heater disposed inside the supply duct and configured to generate heat to heat the airflow passing through the supply duct, and
a dehumidifier disposed inside, and at an upper portion of, the rear duct and configured to remove moisture contained in the airflow passing through the rear duct.

12. The washing machine with drying function of claim 11, wherein
the rear duct includes an opening at an upper portion of the rear duct,
the dehumidifier includes a Peltier element, and
the Peltier element is disposed in the opening at the upper portion of the rear duct.

13. The washing machine with drying function of claim 11, wherein
the dehumidifier includes a direct water nozzle that is disposed at an upper portion of the rear duct, the direct water nozzle being configured to spray water toward a lower portion of the rear duct.

14. The washing machine with drying function of claim 13, wherein
the dehumidifier includes:
a connection pipe configured to connect the direct water nozzle to a water supply pipe, and
a dehumidifying valve provided to the connection pipe and configured to open and close so as to selectively supply water from the water supply pipe to the direct water nozzle.

15. The washing machine with drying function of claim 11, further comprising:
a heater holder configured to fix the heater to an upper surface of the supply duct.

16. A washing machine with drying function, comprising:
a cabinet including a laundry insertion hole provided on a front surface of the cabinet;
a tub disposed inside the cabinet and provided with a rear opening and a front opening;
a drum rotatably disposed inside the tub, wherein the laundry insertion hole, the front opening, and the drum are positioned so that laundry is insertable through the laundry insertion hole and then through the front opening to be received in the drum; and
a heated air supplying device including:
a heat exchange duct disposed above the tub, and including an evaporator and a condenser inside the heat exchange duct,
a rear duct disposed behind the tub,
an inlet duct disposed between the rear duct and a first side of the heat exchange duct,
a supply duct disposed on a second side of the heat exchange duct,
a blower fan disposed in front of the tub and configured to generate an airflow that flows from the rear opening, then through the rear duct, then through the inlet duct, then through the heat exchange duct, then through the supply duct, and then to the front opening, and
a dehumidifier disposed inside the rear duct and configured to remove moisture contained in the airflow passing through the rear duct,
wherein the supply duct is disposed between the heat exchange duct and the blower fan, and formed to connect the heat exchange duct and the blower fan.

* * * * *